United States Patent [19]
Oba et al.

[11] Patent Number: 5,959,663
[45] Date of Patent: Sep. 28, 1999

[54] STEREOSCOPIC IMAGE GENERATION METHOD AND APPARATUS THEREOF

[75] Inventors: Seisuke Oba, Kanagawa; Takao Kumagai, Tokyo; Hitoshi Fukudome, Kanagawa; Nobuyuki Minami, Kanagawa; Nariyasu Hamahata, Kanagawa, all of Japan

[73] Assignee: Sony Corporation, Tokyo, Japan

[21] Appl. No.: 08/860,270

[22] PCT Filed: Oct. 18, 1996

[86] PCT No.: PCT/JP96/03027

§ 371 Date: Sep. 23, 1997

§ 102(e) Date: Sep. 23, 1997

[87] PCT Pub. No.: WO97/15150

PCT Pub. Date: Apr. 24, 1997

[30] Foreign Application Priority Data

Oct. 19, 1995 [JP] Japan ................................ 7-297371

[51] Int. Cl.$^6$ ................................................. H04N 13/02
[52] U.S. Cl. ................ 348/46; 348/48; 348/56; 345/7
[58] Field of Search ..................... 348/42, 43, 44, 348/56, 48, 49, 345, 578; 345/7, 8; 358/3, 87, 92, 88; 350/334; 395/125; H04N 13/02

[56] References Cited

U.S. PATENT DOCUMENTS

| | | | |
|---|---|---|---|
| 4,734,756 | 3/1988 | Butterfield et al. ........................ | 358/3 |
| 4,943,852 | 7/1990 | Femano et al. ........................... | 358/88 |
| 5,007,715 | 4/1991 | Verhultst .................................. | 350/334 |
| 5,099,320 | 3/1992 | Allio ......................................... | 358/88 |
| 5,130,794 | 7/1992 | Ritchey .................................... | 358/87 |
| 5,193,000 | 3/1993 | Lipton et al. ............................. | 358/92 |
| 5,361,100 | 11/1994 | Teece ...................................... | 348/578 |
| 5,416,509 | 5/1995 | Sombrowsky ........................... | 348/42 |
| 5,495,576 | 2/1996 | Ritchey .................................... | 395/125 |
| 5,510,832 | 4/1996 | Garcia ...................................... | 348/46 |
| 5,640,171 | 6/1997 | Shimada ................................... | 345/8 |

FOREIGN PATENT DOCUMENTS

| | | |
|---|---|---|
| 7-182533 | 7/1995 | Japan . |
| 7-200870 | 8/1995 | Japan . |
| 7-226958 | 8/1995 | Japan . |

*Primary Examiner*—Tommy P. Chin
*Assistant Examiner*—Tung Vo
*Attorney, Agent, or Firm*—Frommer Lawrence & Haug, LLP; William S. Frommer; Dennis M. Smid

[57] ABSTRACT

The transform arithmetic operations by spatial image transform matrixes and perspective transform matrixes to a screen surface thereon are executed on source video signal representing two-dimensional image so as to generate left-eye and right-eye video signals. It is possible to realize the stereoscopic image generation apparatus capable of setting the visual difference between a left eye and a right eye easily.

20 Claims, 7 Drawing Sheets

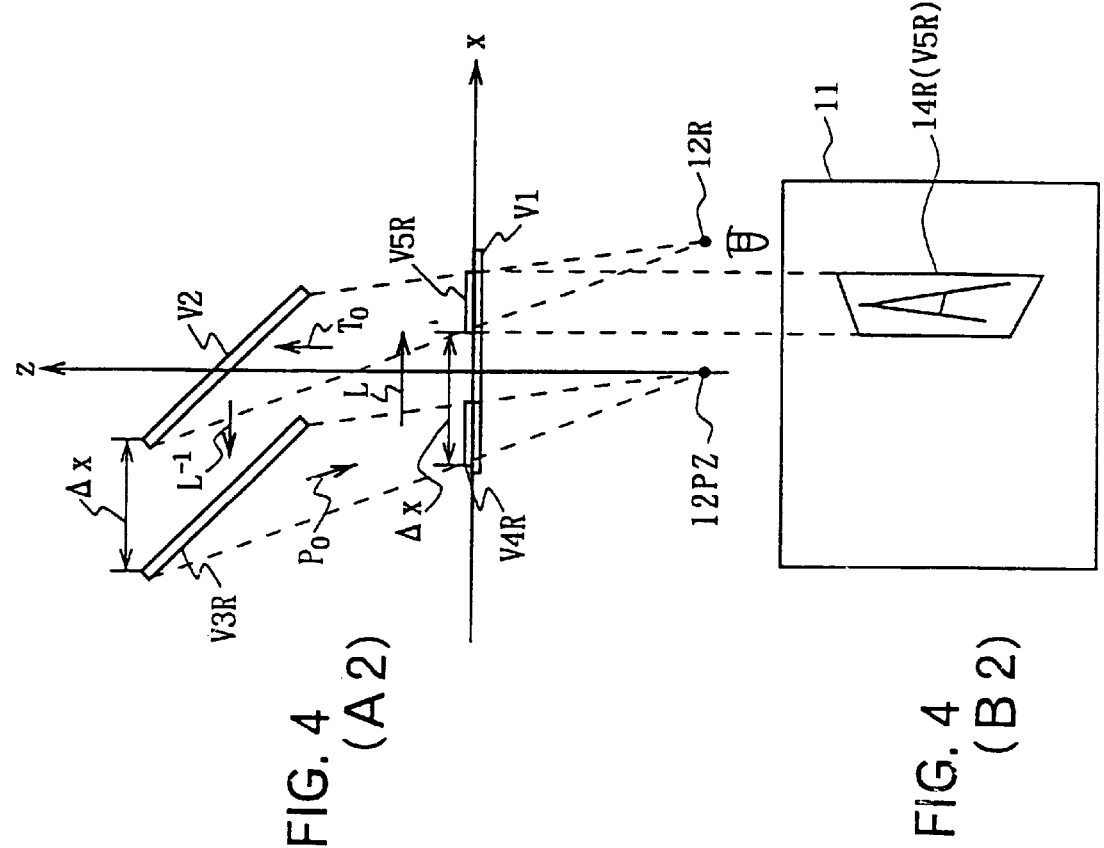
FIG. 4 (A1)
FIG. 4 (A2)
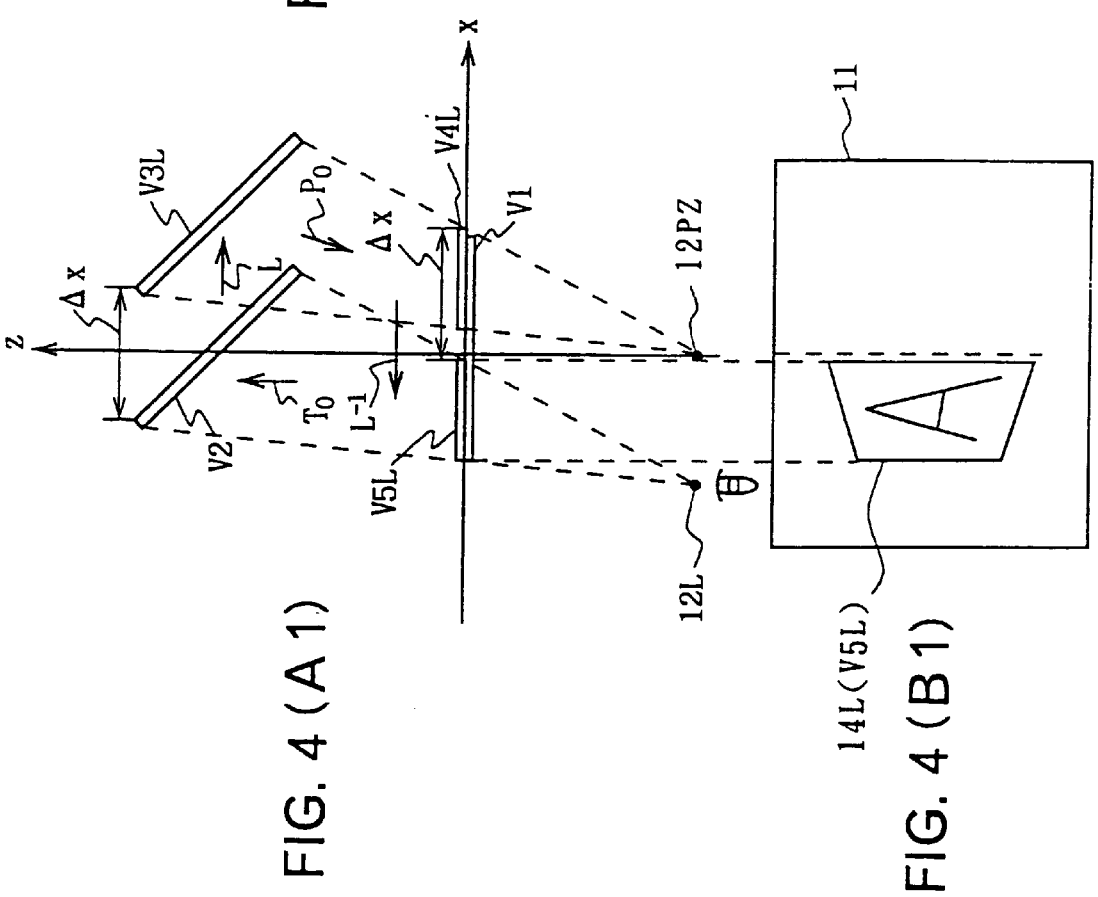
FIG. 4 (B1)
FIG. 4 (B2)

STEREOSCOPIC IMAGE GENERATION METHOD AND APPARATUS THEREOF

TECHNICAL FIELD

The present invention relates to a stereoscopic image generation method and apparatus thereof, which particularly will generate a stereoscopic image that the operator can perceive in a virtual space based on the video signal representing two-dimensional image.

BACKGROUND ART

Hitherto, a stereoscopic image display apparatus as shown in FIG. 1 is proposed as a stereoscopic image generation apparatus which enables the operator to appreciate stereoscopic images.

The stereoscopic image display apparatus 1 is constructed so as to project left-eye projecting light and right-eye projecting light from a left-eye projector 2L and a right-eye projector 2R through each read, green, and blue three primary color polarized filters 3LR, 3LG, 3LB, and 3RR, 3RG, 3RB on a screen 4 to display color composite image on the screen 4, so that the operator can see the color composite image through glasses 5 having a left-eye filter 5L and a right-eye filter 5R.

In this case, the operator sees the left-eye image out of the color composite image projected from the left-eye projector 2L through the left-eye filter 5L, and also sees the right-eye image projected from the right-eye projector 2R through the right-eye filter 5R. As a result, as shown in FIGS. 2(A) to 2(C), the operator perceives the color composite image on the screen 4 as a stereoscopic image based on visual difference between a left eye 6L and a right eye 6R.

Incidentally, as shown in FIG. 2(A), when a left-eye image 7L projected from the left-eye projector 2L and a right-eye image 7R projected from the right-eye projector 2R are displayed on the same position on the screen 4, 8L, the operator's left eye 6L, is crossed with 8R, the operator's right eye 6R, at the same point on the screen 4, so that the operator recognizes as if "there is a composite stereoscopic image on the screen 4."

On the contrary, as shown in FIG. 2(B), when the left-eye image 7L and the right-eye image 7R are displayed shifting with each other at the position opposite to the left eye 6L and the right eye 6R on the screen 4, a virtual image 9B is imaged at the point in the virtual space (it is generated backward than the screen 4) in which the operator's eye BL seeing the left-eye image 7L by the his/her left eye 6L and the operator's eye 8R seeing the right-eye image 7R by the his/her right eye 6R are crossed. This makes the operator to recognize as if "there is a composite stereoscopic image backward the screen 4."

Further, as shown in FIG. 2(C), when the right-eye image 7R and the left-eye image 7L are projected at the position on the screen 4 opposite to the left eye 6L and the right eye 6R, the operator's eye 8L seeing the left-eye image 7L by the left eye 6L and the operator's eye 8R seeing the right-eye image 7R by the right eye 6R are crossed at the forward position than the screen 4 in the virtual space, and a virtual image 9F is imaged. This makes the operator recognize as if "there is a composite stereoscopic image in front of the screen 4."

Consequently, since the projecting points of the left-eye image 7L and the right-eye image 7R on the screen 4 can be shifted by the distance corresponding to the visual difference between the left eye 6L and the right eye 6R, the operator can appreciate the composite stereoscopic image as if it were displayed at the position of the screen 4, or backward or front in the screen 4.

When generating a stereoscopic image by way of such method, however, it is very difficult actually to decide the projecting positions of the left-eye image 7L and the right-eye image 7R projected from the left-eye projector 2L and the right-eye projector 2R, which requires the operator well enough skill.

Incidentally, visual difference between the left eye 6L and the right eye 6R is actually not so large (3.25 [cm] and the like), so that actual generation of effective stereoscopic image requires the complicated setting operation that the skilled operator sets the projecting point of the left-eye image 7L and the right-eye image 7R by changing with trials and errors.

DISCLOSURE OF THE INVENTION

The present invention has been made in view of the aforementioned points and proposes a stereoscopic image generation method and apparatus thereof which is capable of easily displaying the composite stereoscopic image of the left-eye image and the right-eye image at desirable position on the screen as needed.

To solve the aforementioned problems, in the present invention, processes source video signal with the image transform process by way of left-eye image transform process means and right-eye image transform process means, so that the left-eye image and the right-eye image can be generated at the desired position on the screen corresponding to the visual difference.

In order to obtain the left-eye image, the image transform arithmetic operation for generating left-eye stereoscopic video signal from the source video signal is executed based on a spatial image transform matrix for converting the image represented by the source video signal to a virtual spatial position and a left-eye perspective transform matrix for having a converted image represented by a transform video signal converted to the virtual spatial position seen through. Further, in order to obtain the right-eye image, the image transform arithmetic operation for generating right-eye stereoscopic video signal from the source video signal is executed based on the spatial image transform matrix and a right-eye perspective transform matrix for having a converted image represented by a transform video signal seen through.

Thus, according to the present invention, the left-eye and right-eye images can have the appropriate visual difference between each other by the parameter that the operator inputs based on the input video signal showing a two-dimensional image, so that it is possible to generate a stereoscopic image having much finer picture quality.

Further, according to the present invention, when the operator processes the desired three-dimensional process to the two-dimensional source video signal, use of the spatial transform matrix and the left-eye perspective transform matrix and the right-eye perspective transform matrix can generate a left-eye and right-eye two-dimensional video signals having appropriate visual difference with each other easily by arithmetic operation based on the spatial position of the converted source video signal.

Further, the source video signal is moved continuously by frames in the three-dimensional space based on the operator's operation, the right-eye video signal and the left-eye video signal in real time interlocking with the continuous movement of the source video signal.

Further, the simultaneous image transform process based on one input video signal at the time of generating the left-eye and right-eye images removes such complicated process as re-synchronization of the left-eye and right-eye images, which makes it possible to generate much better stereoscopic image. Accordingly, it is possible to display the left-eye video signal and the right-eye video signal synchronizing with each other all the time on the screen.

BRIEF DESCRIPTION OF THE DRAWING

FIGS. 4(A1) to (B2) are schematic diagrams explaining the movement principle of the stereoscopic image generation apparatus and method thereof according to the present invention.

BEST MODE FOR CARRYING OUT THE INVENTION

Figure 1:
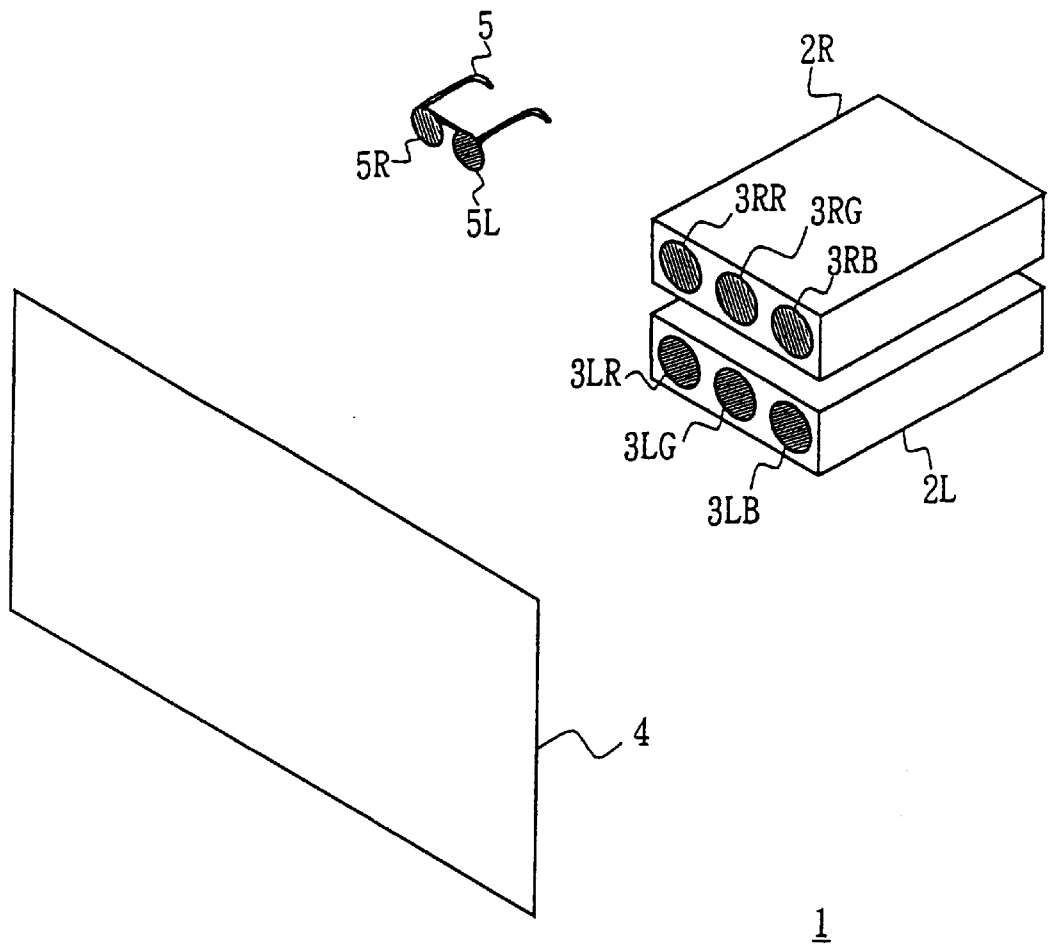
FIG. 1 is a perspective view showing a stereoscopic image display apparatus to which the present invention can be applied.

Referring to the drawings, one embodiment of the present invention will be described in detail.

(1) Generation Principle of the Stereoscopic Image

Figure 3:
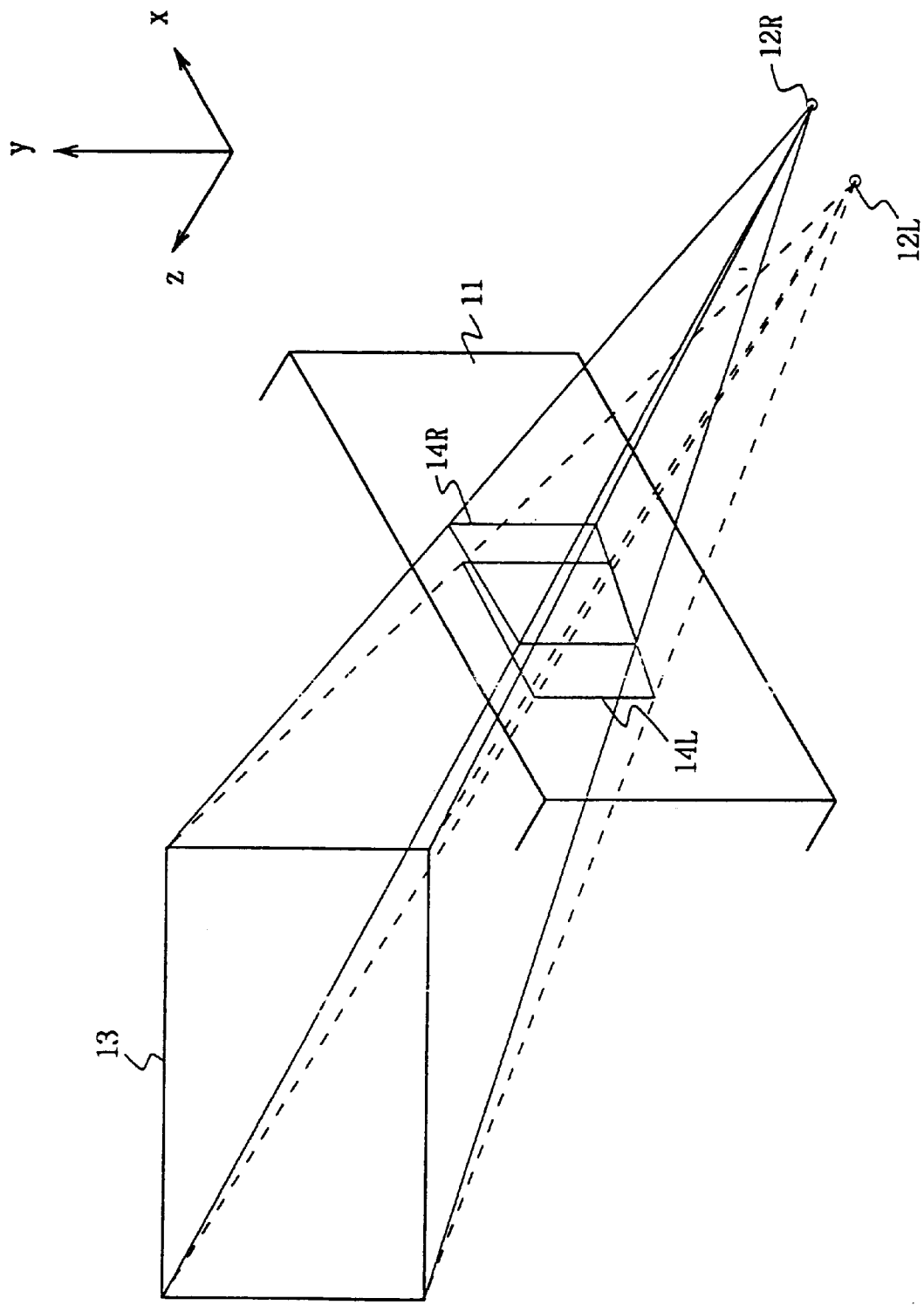
FIG. 3 is a schematic diagram explaining the left-eye and right-eye images to be generated by the present invention.

A method of generating a stereoscopic image according to the present invention is as follows. As shown in FIG. 3, in xyz-virtual space including a screen 11, an image transform arithmetic operation is executed so as to obtain left-eye and right-eye images 14L and 14R in which the image of an object 13 is seen through on a screen 11 along the directions of left and right eyes 12L and 12R when the left eye 12L and the right eye 12R see the object 13, a composite stereoscopic image having depth, at an arbitrary position.

Here, the depth means the information representing the position in the direction along the centerline passing between the left eye 12L and the right eye 12R both watching the object 13.

As shown in FIG. 4(A1), an image V1 shown by an input video signal as a source video signal (referred to as an object) is set as the image displayed at the origin of xy-plane on the display screen of the screen 11 on x- and y-axes.

The object V1, the image of the input video signal input as the source video signal, is processed a parallel movement arithmetic operation and a rotary arithmetic operation by a three-dimensional image transform matrix $T_0$ represented by the following equation:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_0 \end{bmatrix} \quad (1)$$

so as to be converted to an intermediate transform image V2.

The transform process according to the three-dimensional image transform matrix $T_0$ executes the image transform arithmetic operation on the input video signal with the spatial image transform matrix $T_0$, which makes the image of the object V1 represented by the input video signal move in parallel in the depth direction from the position on the x-y plane along z-axis on the screen 11 and rotate. As a result, the input video signal converted to the converted image having the depth information at backward position of the screen 11.

The intermediate transform image V2 is converted for the image transform representing visual difference from the left eye 12L by $+\Delta x$ movement matrix L represented by the following equation:

$$L = \begin{bmatrix} 1 & 0 & 0 & 0 \\ 0 & 1 & 0 & 0 \\ 0 & 0 & 1 & 0 \\ \Delta x & 0 & 0 & 1 \end{bmatrix} \quad (2)$$

Consequently, an intermediate transform image V3L is obtained.

The $+\Delta x$ movement matrix L means execution of the transform arithmetic operation which moves the intermediate transform image V2 in the direction along x-axis in parallel by the distance of $+\Delta x$. The left eye 12L is therefore assumed to be on z-axis and in the condition of seeing the intermediate transform image V3L from its position 12LX.

Next, the intermediate transform image VL3 is converted by using a see-through matrix $P_0$ represented by the following equation:

$$P_0 = \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (3)$$

As a result, an intermediate transform image V4L is obtained on the screen 11 on x- and y-axes.

The process by the see-through matrix $P_0$ means that, when the intermediate transform image V3L is in the direction from the position 12LX of the left eye 12L, the intermediate transform image V4L can be seen by having the see-through image of the intermediate transform image V3L seen through on the screen 11.

Next, the intermediate transform image V4L is converted by $-\Delta x$ movement matrix $L^{-1}$ represented by the following equation:

$$L^{-1} = \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix} \quad (4)$$

As a result, it is converted to a final transform image V5L.
$-\Delta x$ movement matrix $L^{-1}$ moves the intermediate image V4L in the direction of x-axis in parallel by the distance of −Δx. Assuming z-axis to be the center between the left eye 12L and the right eye 12R, the position of the left eye 12L is moved by Δx from the center to left, so that the final transform image V5L is obtained as the see-through image on the screen 11 (FIG. 4(B1)) when the left eye 12L sees the intermediate transform image V2 from the original position.

Since the intermediate transform image V2 is deep, a left-eye image 14L shows a see-through image as the forward part of image seems to be bigger and the backward part of image seems to become smaller in the direction of depth.

The transform parameter $r_{11}$ to $r_{33}$ used in the equation (1) rotates the input image V1 in the three-dimensional space of x-, y-, and z-axes. The parameter $l_x$, $l_y$, and $l_z$ moves the input image V1 in parallel in the direction of x-, y-, and z-axes. The transform parameter S0 enlarges and reduces the input image V1 two-dimensionally.

Further, the transform parameter Δx, −Δx used in the equations (2) and (4) moves the intermediate transform image in parallel by the distance +Δx and −Δx.

Further, the transform parameter $P_z$ used in the equation (3) is a perspective value for applying the perspective for having the intermediate transform image V3L seen through on the screen 11, and is set to the value in which the value of the following equation:

$$P_z = -\frac{1}{16} \quad (5)$$

is the reference value; it means that the operator's eyes are at the position of −16 on the z-axis.

The summary of the transform processes of the left-eye image 14L shown in FIG. 4(A1) can be represented by the following equations.

More specifically, noticing a first transform process step for converting the object V1 to the intermediate transform image V2 by gain of the left-eye final transform image V5L based on the object V1, the image of the input video signal, and a second transform process step for converting so as to obtain the left-eye image 14L, the left-eye transform matrix TL can be represented by the following equation:

$$T_L = T_0 P_L \quad (6)$$

which multiplies the transform matrix $T_0$ according to the equation (1) by the transform matrix $T_L$ showing the transform process thereafter.

Here, the transform matrix $P_L$ used at the second transform process step is a perspective transform matrix as shown in the following equation:

$$P_L = L P_0 L^{-1} \quad (7)$$

By substituting the equations (2), (3), and (4) into the equation (7), the following equation:

$$P_L = \begin{bmatrix} 1 & 0 & 0 & 0 \\ 0 & 1 & 0 & 0 \\ 0 & 0 & 1 & 0 \\ \Delta x & 0 & 0 & 1 \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix} \quad (8)$$

$$= \begin{bmatrix} 1 & 0 & 0 & 0 \\ 0 & 1 & 0 & 0 \\ -P_z \Delta x & 0 & 0 & P_z \\ 0 & 0 & 0 & 1 \end{bmatrix}$$

can be expressed.

Here, by substituting the equations (1) and (8) into the equation (6), the left-eye transform matrix $T_L$ can be expressed as follows:

$$T_L = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_0 \end{bmatrix} \begin{bmatrix} 1 & 0 & 0 & 0 \\ 0 & 1 & 0 & 0 \\ -P_z \Delta x & 0 & 0 & P_z \\ 0 & 0 & 0 & 1 \end{bmatrix} \quad (9)$$

$$= \begin{bmatrix} r_{11} - r_{13} P_z \Delta x & r_{12} & 0 & r_{13} P_z \\ r_{21} - r_{23} P_z \Delta x & r_{22} & 0 & r_{23} P_z \\ r_{31} - r_{33} P_z \Delta x & r_{32} & 0 & r_{33} P_z \\ l_x - l_z P_z \Delta x & l_y & 0 & l_z P_z + S_0 \end{bmatrix}$$

Incidentally in the transform matrix $T_L$ represented by the equation (9), after the image data is captured in the frame memory, the input video signal actually executes the transform process by the parameter consisting the matrix. However, since both the data read out from the frame memory and the image data displayed on the screen 11 are two-dimensional data, arithmetic operation for two-dimensional address does not need the parameters in the third line and third column of the equation (9).

Consequently, the transform matrix $T_{L33}$ represented by the following equation which omits the third line and the third column from the equation (9):

$$T_{L33} = \begin{bmatrix} r_{11} - r_{13} P_z \Delta x & r_{12} & r_{13} P_z \\ r_{21} - r_{23} P_z \Delta x & r_{22} & r_{23} P_z \\ l_x - l_z P_z \Delta x & l_y & l_z P_z + S_0 \end{bmatrix} \quad (10)$$

is used as the matrix for converting the position vector [x, y] on the frame memory to the position vector [$X_s$, $Y_s$] on the screen 11.

Here, the transform matrixes of four lines by four columns as shown in the equations (1) to (4) represent different dimensional conversion as the rotary transform and enlargement/reduction in the same coordinate system, which makes the matrix of 4×4; this is generally called Homogeneous Coordinate.

When the two-dimensional position vector [x, y] on the frame memory and the two-dimensional position vector [$X_s$, $Y_s$] on the screen 11 are represented in the Homogeneous Coordinate, [x, y] can be represented to [x, y, H] and [$X_s$, $Y_s$] can be represented to [$X_s$, $Y_s$, 1]. H is the value showing an image enlargement ratio transformed by the perspective, which is proportioned to the value of the position vector in the direction of z-axis.

Operation of the transform matrix $T_{L33}$ to the position vector [x, y, H] on the frame memory can obtains the vector [$X_s$, $Y_s$, 1]. The obtained vector on the screen 11 is defined as follows:

$$[X_s, Y_s, 1] = [x y H] T_{L33} \quad (11)$$

In this embodiment, however, when the spatial image transform is executed, an address on the frame memory is specified to a screen address supplied sequentially corresponding to raster scanning as three-dimensional transform at the time of reading out the input data from the frame memory.

Figure 5:
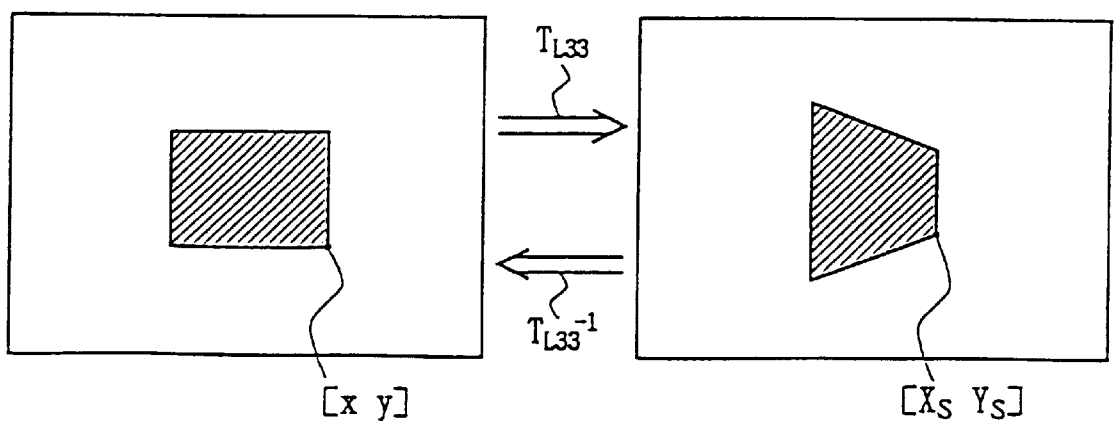
FIG. 5 is a schematic diagram explaining the image transform process between positional vector on a frame memory and positional vector on the screen.
Figure 2:
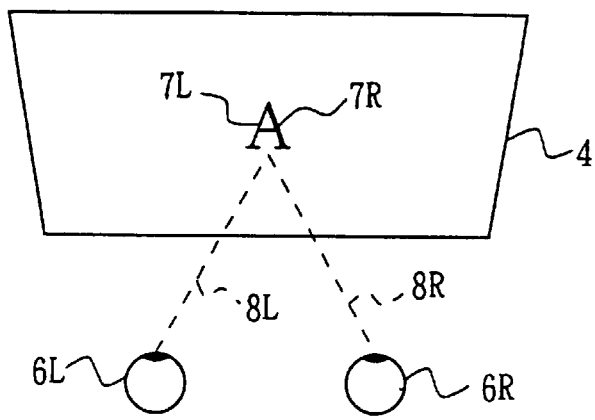
FIGS. 2(A) to 2(C) are schematic diagrams explaining that the operator can perceive a stereoscopic image according to the structure of FIG. 1.
Figure 2:
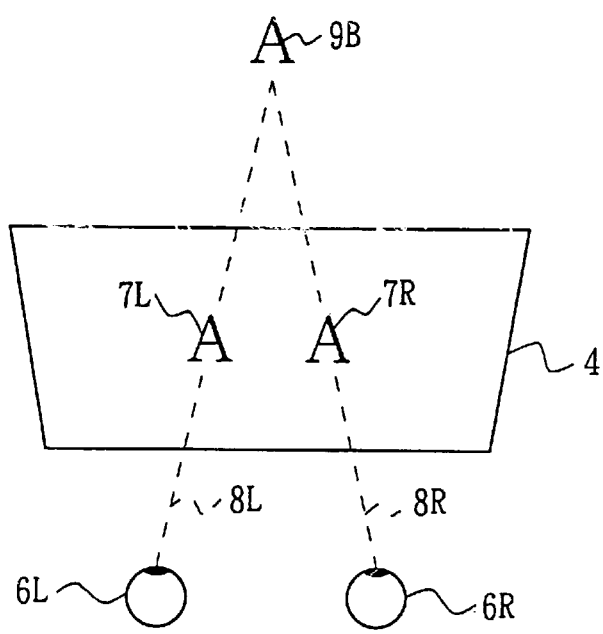
Figure 2:
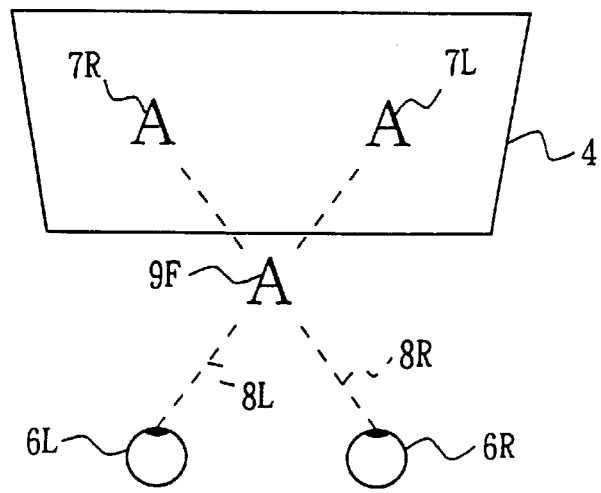

More specifically, as shown in FIG. 5, when the inverse arithmetic operation as follows:

$$[x y H] = [X_s Y_s 1] T_{L33}^{-1} \quad (12)$$

is executed, the designation of the position vector [x, y, H] of the corresponding frame memory is made corresponding to sequential designation of the position vector $[X_s, Y_s, 1]$ on the screen 11 according to the raster scanning. Therefore, supply of the position vector $[x, y, H]$ as the two-dimensional read-out address to the frame memory and the key memory provides the two-dimensional video data and key signal to which spatial image transform is executed.

The inverse transform matrix $T_{L33}^{-1}$ of the equation (12) can be obtained as follows.

First, each element of the transform matrix $T_{L33}$ is set as parameters $a_{11}$ to $a_{33}$ as follows:

$$T_{L33} = \begin{bmatrix} r_{11} - r_{13}P_z\Delta x & r_{12} & r_{13}P_z \\ r_{21} - r_{23}P_z\Delta x & r_{22} & r_{23}P_z \\ l_x - l_zP_z\Delta x & l_y & l_zP_z + S_0 \end{bmatrix} \quad (13)$$

$$= \begin{bmatrix} a_{11} & a_{12} & a_{13} \\ a_{21} & a_{22} & a_{23} \\ a_{31} & a_{32} & a_{33} \end{bmatrix}$$

Also, the parameters of the inverse matrix $T_{L33}^{-1}$ are represented as parameters $b_{11}$ to $b_{33}$ as follows:

$$T_{L33}^{-1} = \begin{bmatrix} a_{11} & a_{12} & a_{13} \\ a_{21} & a_{22} & a_{23} \\ a_{31} & a_{32} & a_{33} \end{bmatrix}^{-1} = \begin{bmatrix} b_{11} & b_{12} & b_{13} \\ b_{21} & b_{22} & b_{23} \\ b_{31} & b_{32} & b_{33} \end{bmatrix} \quad (14)$$

Substitution the equation (14) into the equation (12) can represent the following equation:

$$[x \ y \ H] = [X_s \ Y_s \ 1] \begin{bmatrix} b_{11} & b_{12} & b_{13} \\ b_{21} & b_{22} & b_{23} \\ b_{31} & b_{32} & b_{33} \end{bmatrix} \quad (15)$$

Above equation can be expanded to:

$$[x \ y \ H] = [b_{11}X_s + b_{12}Y_s + b_{13} \quad (16)$$
$$b_{21}X_s + b_{22}Y_s + b_{23}$$
$$b_{31}X_s + b_{32}Y_s + b_{33}]$$

The following equations are thus derived from the equation (16):

$$x = b_{11}X_s + b_{12}Y_s + b_{13} \quad (17)$$

$$y = b_{21}X_s + b_{22}Y_s + b_{23} \quad (18)$$

$$H = b_{31}X_s + b_{32}Y_s + b_{33} \quad (19)$$

by which the value of each element of the position vector $(x, y, H)$ on the frame memory can be obtained.

The position vector $[x, y, H]$ on the frame memory, however, is on the Homogeneous Coordinate. Normalization of the coordinate values $x, y$ by the parameter $H$ can restore it to the two-dimensional coordinate system.

Accordingly, the address $[X_{Lm}, Y_{Lm}]$ on the frame memory can be obtained as follows:

$$X_{Lm} = \frac{x}{H} \quad (20)$$
$$= \frac{b_{11}X_s + b_{12}Y_s + b_{13}}{b_{31}X_s + b_{32}Y_s + b_{33}}$$

$$Y_{Lm} = \frac{Y}{H} \quad (21)$$
$$= \frac{b_{21}X_s + b_{22}Y_s + b_{23}}{b_{31}X_s + b_{32}Y_s + b_{33}}$$

The data of the pixels corresponding to the screen address $(X_s, Y_s)$ thus can be read out sequentially from the frame memory and the key information memory by using the address data $X_{LM}$ and $Y_{rLM}$.

In the equations (20) and (21), the values of $B_{11}$ to $b_{33}$ are obtained as follows from the equation (14):

$$b_{11} = \frac{-a_{32}a_{23} + a_{22}a_{33}}{W_1} \quad (22)$$

$$b_{12} = \frac{a_{32}a_{13} - a_{12}a_{33}}{W_1} \quad (23)$$

$$b_{13} = \frac{-a_{22}a_{13} + a_{12}a_{23}}{W_1} \quad (24)$$

$$b_{21} = \frac{a_{31}a_{23} - a_{21}a_{33}}{W_1} \quad (25)$$

$$b_{22} = \frac{-a_{31}a_{13} + a_{11}a_{33}}{W_1} \quad (26)$$

$$b_{23} = \frac{a_{21}a_{13} - a_{11}a_{23}}{W_1} \quad (27)$$

$$b_{31} = \frac{-a_{22}a_{31} + a_{21}a_{32}}{W_1} \quad (28)$$

$$b_{32} = \frac{a_{12}a_{31} - a_{11}a_{32}}{W_1} \quad (29)$$

$$b_{33} = \frac{-a_{12}a_{21} + a_{11}a_{22}}{W_1} \quad (30)$$

Provided that, it is:

$$W_1 = -a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \quad (31)$$

Here, the values of $a_{11}$ to $a_{33}$ are obtained as follows from the equation (13):

$$a_{11} = r_{11} - r_{13}P_z\Delta x, \ a_{12} = r_{12}, \ a_{13} = r_{13}P_z \quad (32)$$

$$a_{21} = r_{21} - r_{23}P_z\Delta x, \ a_{22} = r_{22}, \ a_{23} = r_{23}P_z \quad (33)$$

$$a_{31} = l_x - l_zP_z\Delta x, \ a_{32} = l_y, \ a_{33} = l_zP_z + S_0 \quad (34)$$

Thus, substitution of the above values into the equations (22) to (31) can expresses the following equations:

$$b_{11} = \frac{-l_yr_{23}P_z + r_{22}(l_zP_z + S_0)}{W_1} \quad (35)$$

$$b_{12} = \frac{l_yr_{13}P_z + r_{12}(l_zP_z + S_0)}{W_1} \quad (36)$$

$$b_{13} = \frac{-r_{22}r_{13}P_z + r_{12}r_{23}P_z}{W_1} \quad (37)$$

$$b_{21} = \frac{(l_x - l_zP_z\Delta x)r_{23}P_z - (r_{21} - r_{23}P_z\Delta x)(l_zP_z + S_0)}{W_1} \quad (38)$$

$$b_{22} = \frac{-(l_x - l_zP_z\Delta x)r_{13}P_z + (r_{11} - r_{13}P_z\Delta x)(l_zP_z + S_0)}{W_1} \quad (39)$$

-continued $$b_{23} = \frac{(r_{21} - r_{23}P_z\Delta x)r_{13}P_z - (r_{11} - r_{13}P_z\Delta x)r_{23}P_z}{W_1} \quad (40)$$

$$b_{31} = \frac{-r_{22}(l_x - l_zP_z\Delta x) + (r_{21} - r_{23}P_z\Delta x)l_y}{W_1} \quad (41)$$

$$b_{32} = \frac{r_{12}(l_x - l_zP_z\Delta x) - (r_{11} - r_{13}P_z\Delta x)l_y}{W_1}. \quad (42)$$

$$b_{33} = \frac{-r_{12}(r_{21} - r_{23}P_z\Delta x) + (r_{11} - r_{13}P_z\Delta x)r_{22}}{W_1} \quad (43)$$

$$W_1 = -r_{22}(l_x - l_zP_z\Delta x)r_{13}P_z + \quad (44)$$
$$(r_{21} - r_{23}P_z\Delta x)l_y r_{13}P_z +$$
$$r_{12}(l_x - l_zP_z\Delta x)r_{23}P_z -$$
$$(r_{11} - r_{13}P_z\Delta x)l_y r_{23}P_z -$$
$$r_{12}(r_{21} - r_{23}P_z\Delta x)(l_zP_z + S_0) +$$
$$(r_{11} - r_{13}P_z\Delta x)r_{22}(l_zP_z + S_0)$$

by using the parameters set by the operator in the transform matrixes represented in the equations (1) to (4).

Thus substitution of the values obtained in the equations (35) to (44) into the equations (20) and (21) supplies the read-out address $(X_{LM}, Y_{LM})$ as follows to the frame memory:

$$X_{Lm} = \frac{1}{H}[\{-l_x r_{23}P_z + r_{22}(l_zP_z + S_0)\}X_s + \quad (45)$$
$$\{l_y r_{13}P_z + r_{12}(l_zP_z + S_0)\}Y_s +$$
$$(-r_{22}r_{13}P_z + r_{12}r_{23}P_z)]$$

$$Y_{Lm} = \frac{1}{H}[\{(l_x - l_zP_z\Delta x)r_{23}P_z - \quad (46)$$
$$(r_{21} - r_{23}P_z\Delta x)(l_zP_z + S_0)\}X_s +$$
$$\{-(l_x - l_zP_z\Delta x)r_{13}P_z +$$
$$(r_{11} - r_{13}P_z\Delta x)(l_zP_z + S_0)\}Y_s +$$
$$\{r_{21} - r_{23}P_z\Delta x)r_{13}P_z -$$
$$(r_{11} - r_{13}P_z\Delta x)r_{23}P_z\}]$$

Here, it is as follows:

$$H = \{-r_{22}(l_x - l_zP_z\Delta x) + (r_{21} - r_{23}P_z\Delta x)l_y\}X_s + \quad (47)$$
$$\{r_{12}(l_x - l_zP_z\Delta x) - (r_{11} - r_{13}P_z\Delta x)l_y\}Y_s +$$
$$\{-r_{12}(r_{21} - r_{23}P_z\Delta x) + (r_{11} - r_{13}p_z\Delta x)r_{22}\}$$

The processes described above are the arithmetic operations for the left-eye image transform to the object V1 shown in FIG. 4(A1). The arithmetic operations for the right-eye image transform is also executed corresponding to the arithmetic operations for the left-eye image transform as shown in FIG. 4(A2).

More specifically, the three-dimensional transform matrix $T_0$ moves the object V1 input as an image of the input video signal at the origin of x-y plane on the screen 11 in parallel in the depth direction on z-axis, and then rotates it to convert to an intermediate transform image V2.

Then, as the transform process for representing the visual difference of the right eye to the intermediate transform image V2, parallel movement by $-\Delta x$ movement matrix $L^{-1}$ represented by the equation (4) in the parallel direction of x-axis by the distance of $-\Delta x$ converts the intermediate transform image V2 to an intermediate transform image V3.

Then, transform of the intermediate transform image V3R by the see-through matrix $P_0$ represented by the equation (3) provides an intermediate transform image V4R in which the intermediate transform image V3R has been seen through on the screen 11. The intermediate transform image V4R means that, when being at the position 12RX on the z-axis, the right eye 12R obtains the image V4R in which the intermediate transform image V2 is seen through on the screen 11 in the direction of the right eye 12R.

Being converted by the movement matrix L which is represented by the equation (2), the intermediate transform image V4R is moved in parallel in the direction of x-axis by the distance of $+\Delta x$, and then is converted to an final intermediate transform image V5R.

This right-eye final intermediate image V5R is the image in which the intermediate transform image V2 has seen through on the screen 11 in the original direction of the right eye 12R when the right eye 12R at the original position shifted from the center on the z-axis (the center between the left eye 12L and the right eye 12R) in right direction by $\Delta x$ sees the intermediate transform image V2.

The operator can thus see the right-eye final transform image V5R as the deep right-eye image 14R on the x-y plane executed the process based on the perspective, in which the front image portion is bigger and the image portion in depth direction becomes smaller.

The transform process for converting the object V1 based on the input video signal to the right-eye final transform image V5R, as shown in FIG. 4(B1), is executed as follows similarly to the left-eye transform process.

More specifically, the following transform matrix $T_R$ on the arithmetic operation for the right eye is as follows:

$$T_R = T_0 P_R \quad (48)$$

which can be regarded that there are two parts; the three-dimensional transform matrix $T_0$ which moves and rotary converts the object V1 on z-axis, and the transform matrix $P_R$ which executes the transform process thereafter. The right-eye transform matrix $P_R$ is represented by the $-\Delta x$ parallel movement matrix $L^{-1}$ of the equation (4), the see-through matrix $P_0$ of the equation (3), and $+\Delta x$ movement matrix L of the equation (2) as follows:

$$P_R = L^{-1} P_0 L \quad (49)$$

Substitution of the equations (4), (3) and (2) into the equation (49) realizes the expansion as follows:

$$P_R = \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ \Delta x & 0 & 0 & 1 \end{bmatrix} \quad (50)$$

$$= \begin{bmatrix} 1 & 0 & 0 & 0 \\ 0 & 1 & 0 & 0 \\ P_z\Delta x & 0 & 0 & P_z \\ 0 & 0 & 0 & 1 \end{bmatrix}$$

If the equation (50) is substituted into the equation (48), the transform matrix $P_R$ for executing the right-eye spatial image transform can be expanded as follows:

$$P_R = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_0 \end{bmatrix} \begin{bmatrix} 1 & 0 & 0 & 0 \\ 0 & 1 & 0 & 0 \\ P_z\Delta x & 0 & 0 & P_z \\ 0 & 0 & 0 & 1 \end{bmatrix} \quad (51)$$

$$= \begin{bmatrix} r_{11}+r_{13}P_z\Delta x & r_{12} & 0 & r_{13}P_z \\ r_{21}+r_{23}P_z\Delta x & r_{22} & 0 & r_{23}P_z \\ r_{31}+r_{33}P_z\Delta x & r_{32} & 0 & r_{33}P_z \\ l_x+l_zP_z\Delta x & l_y & 0 & l_zP_z+S_0 \end{bmatrix}$$

In order to obtain significant information of only the x-y plane, the right-eye transform matrix $T_{R33}$ which is represented by omission of the third line and third column of the equation (51) as the following equation:

$$T_{R33} = \begin{bmatrix} r_{11}+r_{13}P_z\Delta x & r_{12} & r_{13}P_z \\ r_{12}+r_{23}P_z\Delta x & r_{22} & r_{23}P_z \\ l_x+l_zP_z\Delta x & l_y & l_zP_z+S_0 \end{bmatrix} \qquad (52)$$

is used.

Also the right-eye transform process can obtain the vector $[X_s\ Y_s\ 1]$ on the screen 11 by operating the transform matrix $T_{R33}$ to the position vector $[x\ y\ H]$ on the frame memory as mentioned above with regard to FIG. 5. The vector on the screen 11 thus defined by the following equation:

$$[X_sY_s1]=[xyH]T_{R33} \qquad (53)$$

Then, in order to obtain the read-out address used for reading out video data from the frame memory, the above equation is inversely calculated as follows:

$$[xyH]=[X_sY_s1]T_{L33}^{-1} \qquad (54)$$

This enables to specify the position vector $[x\ y\ H]$ of the frame memory corresponding to the position vector $[X_s\ Y_s\ 1]$ on the screen 11 when the position vector $[X_s\ Y_s\ 1]$ is specified according to raster scanning. It is thus possible to obtain the two-dimensional video data and key signal spatially converted the image.

Here, in order to obtain the inverse transform matrix $T_{L33}^{-1}$, the parameters $a_{11}$ to $a_{33}$ and $b_{11}$ to $b_{33}$ are set as elements for the transform matrix $T_{R33}$ and the inverse transform matrix $T_{R33}^{-1}$ as follows:

$$T_{R33} = \begin{bmatrix} r_{11}+r_{13}P_z\Delta x & r_{12} & r_{13}P_z \\ r_{21}+r_{23}P_z\Delta x & r_{22} & r_{23}P_z \\ l_x+l_zP_z\Delta x & l_y & l_zP_z+S_0 \end{bmatrix} \qquad (55)$$

$$= \begin{bmatrix} a_{11} & a_{12} & a_{13} \\ a_{21} & a_{22} & a_{23} \\ a_{31} & a_{32} & a_{33} \end{bmatrix}$$

$$T_{R33}^{-1} = \begin{bmatrix} a_{11} & a_{12} & a_{13} \\ a_{21} & a_{22} & a_{23} \\ a_{31} & a_{32} & a_{33} \end{bmatrix}^{-1} = \begin{bmatrix} b_{11} & b_{12} & b_{13} \\ b_{21} & b_{22} & b_{23} \\ b_{31} & b_{32} & b_{33} \end{bmatrix} \qquad (56)$$

Those equations permits to obtain the parameters $b_{11}$ to $b_{33}$ as follows:

$$b_{11} = \frac{-a_{32}a_{23}+a_{22}a_{33}}{W_1} \qquad (57)$$

$$b_{12} = \frac{a_{32}a_{13}-a_{12}a_{33}}{W_1} \qquad (58)$$

$$b_{13} = \frac{-a_{22}a_{13}+a_{12}a_{23}}{W_1} \qquad (59)$$

$$b_{21} = \frac{a_{31}a_{23}-a_{21}a_{33}}{W_1} \qquad (60)$$

$$b_{22} = \frac{-a_{31}a_{13}+a_{11}a_{33}}{W_1} \qquad (61)$$

$$b_{23} = \frac{a_{21}a_{13}-a_{11}a_{23}}{W_1} \qquad (62)$$

$$b_{31} = \frac{-a_{22}a_{31}+a_{21}a_{32}}{W_1} \qquad (63)$$

$$b_{32} = \frac{a_{12}a_{31}-a_{11}a_{32}}{W_1} \qquad (64)$$

$$b_{33} = \frac{-a_{12}a_{21}+a_{11}a_{22}}{W_1} \qquad (65)$$

here, it is as follows:

$$W_1=-a_{22}a_{31}a_{13}+a_{21}a_{32}a_{13}+a_{12}a_{31}a_{23}-a_{11}a_{32}a_{23}-a_{12}a_{21}a_{33}+a_{11}a_{22}a_{33} \qquad (66)$$

The parameters $a_{11}$ to $a_{33}$ are obtained from the equation (55) as follows:

$$a_{11}=r_{11}+r_{13}P_z\Delta x,\ a_{12}=r_{12},\ a_{13}=r_{13}P_z \qquad (67)$$

$$a_{21}=r_{21}+r_{23}P_z\Delta x,\ a_{22}=r_{22},\ a_{23}=r_{23}P_z \qquad (68)$$

$$a_{31}=l_x+l_zP_z66\ x,\ a_{32}=l_y,\ a_{33}=l_zP_z+S_0 \qquad (69)$$

By substituting those equations into the equations (57) to (66) as follows:

$$b_{11} = \frac{-l_yr_{23}P_z+r_{22}(l_zP_z+S_0)}{W_1} \qquad (70)$$

$$b_{12} = \frac{l_yr_{13}P_z+r_{12}(l_zP_z+S_0)}{W_1} \qquad (71)$$

$$b_{13} = \frac{-r_{22}r_{13}P_z+r_{12}r_{23}P_z}{W_1} \qquad (72)$$

$$b_{21} = \frac{(l_x+l_zP_z\Delta x)r_{23}P_z-(r_{21}+r_{23}P_z\Delta x)(l_zP_z+S_0)}{W_1} \qquad (73)$$

$$b_{22} = \frac{-(l_x+l_zP_z\Delta x)r_{13}P_z+(r_{11}+r_{13}P_z\Delta x)(l_zP_z+S_0)}{W_1} \qquad (74)$$

$$b_{23} = \frac{(r_{21}+r_{23}P_z\Delta x)r_{13}P_z-(r_{11}+r_{13}P_z\Delta x)r_{23}P_z}{W_1} \qquad (75)$$

$$b_{31} = \frac{-r_{22}(l_x+l_zP_z\Delta x)+(r_{21}+r_{23}P_z\Delta x)l_y}{W_1} \qquad (76)$$

$$b_{32} = \frac{r_{12}(l_x+l_zP_z\Delta x)-(r_{11}+r_{13}P_z\Delta x)l_y}{W_1}. \qquad (77)$$

$$b_{33} = \frac{-r_{12}(r_{21}+r_{23}P_z\Delta x)+(r_{11}+r_{13}P_z\Delta x)r_{22}}{W_1} \qquad (78)$$

$$\begin{aligned} W_1 = &-r_{22}(l_x+l_zP_z\Delta x)r_{13}P_z+ \\ &(r_{21}+r_{23}P_z\Delta x)l_yr_{13}P_z+ \\ &r_{12}(l_x+l_zP_z\Delta x)r_{23}P_z- \\ &(r_{11}+r_{13}P_z\Delta x)l_yr_{23}P_z- \\ &r_{12}(r_{21}+r_{23}P_z\Delta x)(l_zP_z+S_0)+ \\ &(r_{11}+r_{13}P_z\Delta x)r_{22}(l_zP_z+S_0) \end{aligned} \qquad (79)$$

the values of each element in the matrix can be represented by the parameter in which the operator sets as the transform condition as the equations (1) to (4).

Incidentally, same manner as the above-mentioned equations (15) to (21) can be applied to the right-eye transform arithmetic operation. Substitution of relation of the equation (54) into the equation (56) can represent the following equation:

$$[x \ y \ H] = [X_s \ Y_s \ 1] \begin{bmatrix} b_{11} & b_{12} & b_{13} \\ b_{21} & b_{22} & b_{23} \\ b_{31} & b_{32} & b_{33} \end{bmatrix} \quad (80)$$

which shows the position vector $[x \ y \ H]$ by the position vector $[X_s \ Y_s \ 1]$ and the parameters $b_{11}$ to $b_{13}$. Then, expansion of this equation as follows:

$$[x \ y \ H] = [b_{11}X_s + b_{12}Y_s + b_{13} \quad (81)$$
$$b_{21}X_s + b_{22}Y_s + b_{23}$$
$$b_{31}X_s + b_{32}Y_s + b_{33}]$$

can deduce the position vector $[x \ y \ H]$ on the frame memory as follows:

$$x = b_{11}X_s + b_{12}Y_s + b_{13} \quad (82)$$

$$y = b_{21}X_s + b_{22}Y_s + b_{23} \quad (83)$$

$$H = b_{31}X_s + b_{32}Y_s + b_{33} \quad (84)$$

Since the position vector $[x \ y \ H]$ on the frame memory is the homogeneous coordinate, normalization by the parameter H can deduce the address $(X_{Rm} \ Y_{Rm})$ on the frame memory as follows:

$$X_{Rm} = \frac{x}{H} \quad (85)$$
$$= \frac{b_{11}X_s + b_{12}Y_s + b_{13}}{b_{31}X_s + b_{32}Y_s + b_{33}}$$

$$Y_{Rm} = \frac{Y}{H} \quad (86)$$
$$= \frac{b_{21}X_s + b_{22}Y_s + b_{23}}{b_{31}X_s + b_{32}Y_s + b_{33}}$$

Then, by substituting the equations (70) to (79) into the equations (85) and (86), the read-out address $(X_{Rm} \ Y_{Rm})$ to the frame memory can be set as follows:

$$X_{Rm} = \frac{1}{H}[\{-l_x r_{23} P_z + r_{22}(l_z P_z + S_0)\}X_S + \quad (87)$$
$$\{l_y r_{13} P_z + r_{12}(l_z P_z + S_0)\}Y_S +$$
$$(-r_{22} r_{13} P_z + r_{12} r_{23} P_z)]$$

$$Y_{Rm} = \frac{1}{H}[\{l_x + l_z P_z \Delta x)r_{23} P_z - \quad (88)$$
$$(r_{21} + r_{23} P_z \Delta x)(l_z P_z + S_0)\}X_S +$$
$$\{-(l_x + l_z P_z \Delta x \ r_{13} P_z +$$
$$(r_{11} + r_{13} P_z \Delta x)(l_z P_z + S_0)\}Y_S +$$
$$\{r_{21} + r_{23} P_z \Delta x)r_{13} P_z -$$
$$(r_{11} + r_{13} P_z)\Delta x)r_{23} P_z\}]$$

Here, it is as follows:

$$H = \{-r_{22}(l_x + l_z P_z \Delta x) + (r_{12} + r_{23} P_z \Delta x) \cdot l_y\}X_S + \quad (89)$$
$$\{r_{12}(l_x + l_z P_z \Delta x) - (r_{11} + r_{13} P_z \Delta x) \cdot l_y\}Y_S +$$
$$\{-r_{12} \cdot (r_{21} + r_{23} P_z \Delta x) + (r_{11} + r_{13} P_z \Delta x)r_{22}\}$$

According to the stereoscopic image generation method described above, the intermediate transform images V3L and V3R both of which the object V1 shown by the input video signal is moved and rotated in the depth direction and also moved in $\Delta x$ and $-\Delta x$ directions are seen through on the screen 11 in the direction along the operators' left eye 12L and right eye 12R. Thereby the final transform images V5L and V5R to be projected can be obtained by visual difference between the left eye 12L and the right eye 12R. This enables to generate the deep image of the object on the screen, or backward the screen, or front in the screen based on the visual difference between the left eye 12L and the right eye 12R.

Then, the operator inputs each parameter of the three-dimensional transform matrix $T_0$ defined by the equation (1), $+\Delta x$ movement matrix L defined by the equation (2), the see-through matrix $P_0$ defined by the equation (3), and $-\Delta x$ movement matrix $L^{-1}$ defined by the equation (4), so that it is possible to generate stereoscopic image having arbitrary transform correspondence at arbitrary position as necessary.

According to the processes described above, it is possible to arbitrarily select the parameters in which the operator can set such as $r_{11}$ to $r_{33}$ representing spatial rotation of the converted image, $l_x$, $l_y$ and $l_z$ representing parallel movements in the directions of x, y and z-axes, $S_0$ representing two-dimensional expansion/reduction, $P_z$ representing the perspective value based on the perspective, and the value $\Delta x$ representing a half of distance between the left eye 12L and the right eye 12R if the occasion demand. The image to be generated thus can be specified easily.

Further, the image data representing the image of the input video signal is written in and its read-out address is specified corresponding to the raster scan address on the screen. This enables to generate the left-eye and right-eye final transform images V5L and V5R on the screen 11 at the same time.

(2) First Embodiment of the Stereoscopic Image Generation Apparatus

Figure 6:
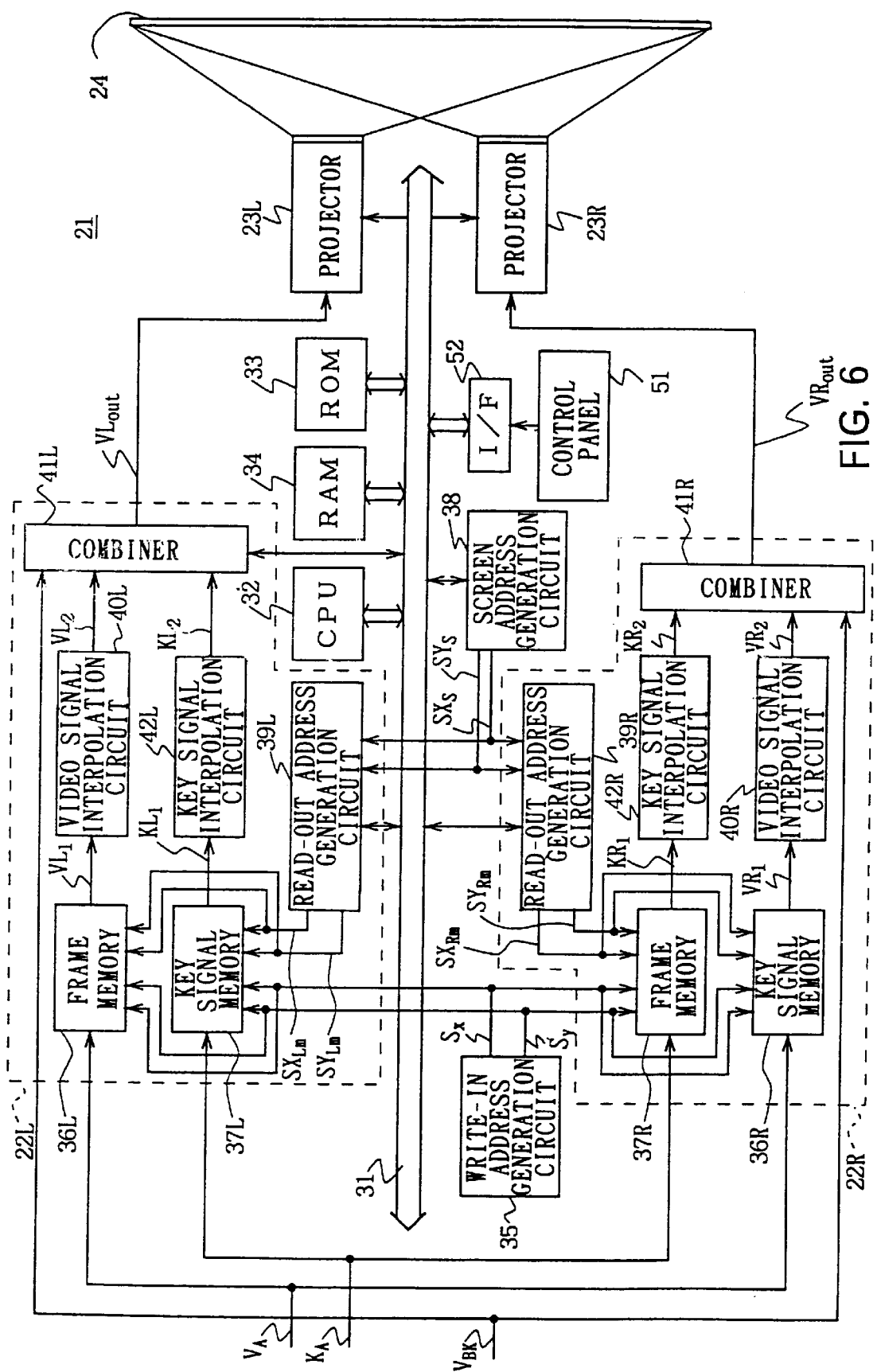
FIG. 6 is a block diagram showing the first embodiment of the stereoscopic image generation apparatus according to the present invention.

In FIG. 6, 21 entirely shows a stereoscopic image generation apparatus, which receives an input video signal $V_A$, an input key signal $K_A$, and an input background signal $V_{BK}$ at a left-eye processor 22L and a right-eye processor 22R, and supplies a left-eye and right-eye stereoscopic image output signals $VL_{OUT}$ and $VR_{OUt}$ respectively representing the left-eye and right-eye final transform images V5L and V5R to a left-eye and right-eye projectors 23L and 23R.

This permits the left-eye and right-eye projector 23L and 23R to project the left-eye and right-eye final transform image V5L and V5R on a screen 24 respectively.

The left-eye processor 22L and the right-eye processor 22R, and the left-eye and right-eye projectors 23L and 23R are controlled by a central process unit (CPU) 32 via a bus 31.

According to a program in a program memory 33 having ROM structure, the CPU 32 utilizes a working memory 34 having RAM structure to execute process operation of each part in the stereoscopic image generation apparatus 21.

The CPU 32 generates write-in address signals Sx and Sy representing position vector $[x \ y]$ on the frame memory at a write-in address generation circuit 35. The write-in address signals Sx and Sy sequentially specify storing position in frame memories 36L and 36R of the left-eye and right-eye processors 22L and 22R so as to store the input video signal $V_A$ as left-eye and right-eye source video data synchronizing with each other.

The write-in address signals Sx and Sy are also supplied to key signal memories 37L and 37R of the left-eye and right-eye processors 22L and 22R. This enables the key signal memories 37L and 37R to store the key data in regard to the position vector [x y] on the frame memories synchronizing with the input video signal $V_A$.

The CPU 32 drives a screen address generation circuit 38 provided for common use of the left-eye and right-eye processors 22L and 22R so as to generate the position vector $[X_s \ Y_s]$ on the screen 24 based on a reference signal generated from a built-in reference signal generation circuit. These screen addresses $SX_s$ and $SY_s$ are supplied to read-out address generation circuits 39L and 39R of the left-eye and right-eye processors 22L and 22R.

The read-out address generation circuits 39L and 39R are under the control of the CPU 32 so as to supply read-out address signal $SX_{Lm}$, $SY_{Lm}$ and $SX_{Rm}$, $SY_{Rm}$ representing read-out addresses $(X_{Lm} \ Y_{Lm})$ and $(X_{Rm} \ Y_{Rm})$, which are respectively specified by the equations (45), (46) and (87) and (88), to the frame memories 36L and 36R and the key signal memories 37L and 37R.

Image data $VL_1$ and $VR_1$ read out from the frame memories 36L and 36R of the left-eye and right-eye processors 22L and 22R are interpolated at video signal interpolation circuits 40L and 40R, and then are supplied to combiners 41L and 41R as read-out video signals $VL_2$ and $VR_2$.

At the same time, key data $KL_1$ and $KR_1$ read out from the key signal memories 37L and 37R of the left-eye and right-eye processors 22L and 22R are interpolated at the key signal interpolation circuits 40L and 40R, and then are supplied to the combiners 42L and 42R as read-out video signal $KL_2$ and $KR_2$.

The combiners 41L and 41R are under the control of the CPU 32 so as to execute the keying process between the read-out video signals $VL_2$ and $VR_2$ and the input background signal $V_{BK}$ by the read-out key signals $KL_2$ and $KR_2$. The combiners 41L and 41R consequently supply the stereoscopic image output signals $VL_{out}$ and $VR_{out}$ represented by the following equations:

$$VL_{out}=KL_2 VL_2+(1-KL_2)V_{BK} \quad (90)$$

$$VR_{out}=KR_2 VR_2+(1-KR_2)V_{BK} \quad (91)$$

as the output from the left-eye and right-eye processors 22L and 22R to the left-eye and right-eye projectors 23L and 23R.

The following description will be made of operation of the stereoscopic image generation apparatus 21.

First, the operator previously inputs the values of visual difference distance $\Delta x$ and perspective value $P_z$ necessary to the arithmetic operation of the present invention via a control panel 51. The CPU 32 stores the visual difference distance $\Delta x$ and the perspective value $P_z$ newly set by the operator in the RAM 34. Incidentally, when detecting no input from the operator, the CPU 32 uses the reference value ($\Delta x=3.25$ cm, $P_z=-1/16$) stored already in the RAM 34.

Then the operator operates a three-dimensional pointing device provided on the control panel 51 to command three-dimensional image transform operation to source video signal. When the operator commands the three-dimensional transform process to the source video signal, the CPU 32 receives $r_{11}$ to $r_{33}$, $l_x$, $l_y$, $l_z$ and $S_0$ which are parameters of matrix $T_0$ showing the three-dimensional transform specified by the operator. At the same time, the CPU 32 receives the visual difference distance $\Delta x$ and the perspective value $P_z$ stored in the RAM 34. Then, the CPU 32 utilizes the received parameters $r_{11}$ to $r_{33}$, $l_x$, $l_y$, $l_z$ and $S_0$, $\Delta x$ and $P_z$ so as to calculate the parameters $b_{11}$ to $b_{33}$ represented in the equations (35) to (43) and the parameters $b_{11}$ to $b_{33}$ represented in the equations (70) to (78). The CPU 32 supplies the calculated values of the parameter $b_{11}$ to $b_{33}$ to the read-out address generation circuit 39L; simultaneously supplies the calculated values of the parameter $b_{11}$ to $b_{33}$ to the read-out address generation circuit 39R.

The read-out address generation circuit 39L generates the left-eye read-out address $(X_{Lm}, Y_{Lm})$ represented in the equation (20) based on the parameters $r_{11}$ to $r_{33}$ supplied from the CPU 32 and the screen address $(X_s, Y_s)$ supplied from the screen address generation circuit 38. The read-out address generation circuit 39L supplies the left-eye read-out address $(X_{Lm}, Y_{Lm})$ to the frame memory 36L and the key signal memory 37L.

At the same time, the read-out address generation circuit 39R generates the right-eye read-out address $(X_{Rm}, Y_{Rm})$ represented in the equation (85) based on the parameters $b_{11}$ to $b_{33}$ supplied from the CPU 32 and the screen address $(X_s, Y_s)$ supplied from the screen address generation circuit 38. The read-out address generation circuit 39R supplies the right-eye read-out address $(X_{Rm}, Y_{Rm})$ to the frame memory 36R and the key signal memory 37R.

As described above, the transform video signal VL1 read out from the frame memory 36L represents the video signal V5L which is projected on the screen surface when the operator sees the video signal V2 converted in the three-dimensional space by the spatial transform matrix $T_0$ from the position of the left eye 12L, as shown in FIG. 4(A1): the transform video signal $VR_1$ read out from the frame memory 36R represents the video signal V5R which is projected on the screen surface when the operator sees the video signal V2 converted in the three-dimensional space by the spatial transform matrix $T_0$ from the position of the right eye 12R, as shown in FIG. 4(A2).

The transform video signals $VL_1$ and $VR_1$ read out from the frame memories 36L and 36R are interpolated at the video signal interpolation circuits 40L and 40R with peripheral pixels, and then are output as the transform video signals $VL_2$ and $VR_2$. The transform key signal $KL_1$ and $KR_1$ read out from the key signal memories 37L and 37R are similarly interpolated at the key signal interpolation circuits 42L and 42R with peripheral pixels, and then are output as the transform key signal $KL_2$ and $KR_2$.

As described above, capture of the input information input by the operator with the control panel 51 through an interface 52 enables the CPU 32 to provide the left-eye and right-eye projectors 23L and 23R with the left-eye and right-eye stereoscopic image output signal $VL_{out}$ and $VR_{out}$, which are generated by converting the input video signal $V_A$ and the input key signal $K_A$ at the same time according to the contents of image transform process specified by the operator, from the left-eye and right-eye processors 22L and 22R.

Here, if the operator sets the parameters $r_{11}$ to $r_{33}$ with the control panel 51, the CPU 32 specifies what degree the object V1 should rotate spatially in regard to the three-dimensional transform matrix $P_0$ at the read-out address generation circuits 39L and 39R.

Further, if the operator sets the parameters $l_x$, $l_y$ and $l_z$ with the control panel 51, the CPU 32 specifies how far the object V1 should move in parallel in the direction of x-axis, y-axis and z-axis in regard to the three-dimensional transform matrix $P_0$ at the read-out address generation circuits 39L and 39R.

Further, if the operator sets the parameter $S_0$ with the control panel 51, the CPU 32 specifies how large or small the object V1 should be extended or reduced on the xy plane in regard to the three-dimensional transform matrix $P_0$ at the read-out address generation circuits 39L and 39R.

Further, if the operator sets the parameter $\Delta x$ with the control panel 51, the CPU 32 generates the read-out address signals $SX_{Lm}$, $SY_{Lm}$ and $SX_{Rm}$, $SY_{Rm}$ which regulate how far the distance $\Delta x$, the half of the distance between the left eye 12L and the right eye 12R, should be in regard to the $+\Delta x$ movement matrix L and $-\Delta x$ movement matrix $L^{-1}$, namely how far visual difference between the left eye 12L and the right eye 12R should be.

In this embodiment, the parameter $P_z$ is structured so that the value is input as 1/16 all the time from the control panel 51. The. CPU 32 thus outputs the read-out address signal for regulating the perspective value based on perspective for the see-through matrix $P_0$ at the read-out address generation circuits 39L and 39R.

The operator therefore can set the parameter $\Delta x$ for regulating the visual difference between the left eye 12L and the right eye 12R on desired value by the control panel 51. This enables to set easily the amount of shift of the left-eye image 14L and the right-eye image 14R consisting of the final converted images V5L and V5R, which are projected on the screen 24 by the left-eye and right-eye projectors 23L and 23R, on the appropriate value at will.

As described above, the read-out address generation circuits 39L and 39R of the left-eye and right-eye processors 22L and 22R execute their processes at the same time based on common screen address signals $SX_s$ and $SY_s$, so that the left-eye and right-eye stereoscopic image output signals $VL_{out}$ and $VR_{out}$ are generated simultaneously. This provides the stereoscopic image having better picture quality.

According to the structure described above, the left-eye perspective transform matrix $P_L$ and the right-eye perspective transform matrix $P_R$ are utilized in the arithmetic operation of the left-eye video signal and the right-eye video signal in which the transform video signal converted to the spatial position by moving and rotating the source video signal V1 in the three-dimensional space is projected on the xy-plane from the position of the left eye 12L and the position of the right eye 12R respectively. The appropriate video signal according to the visual difference between the left eye and the right eye therefore can be generated.

Further, it is possible to generate the left-eye video signal and the right-eye video signal both of which have the visual difference according to the spatial position of the converted video signal V2. In other words, such arithmetic operation is executed as the more the source video signal is converted to the position of the depth direction (direction of +z) three-dimensionally to the screen, the more the left-eye video signal shifts to left and the right-eye video signal shifts to right. Further, such arithmetic operation is also executed as the source video signal is converted to the position of the front direction (direction of −z) three-dimensionally to the screen in contrast with the above, the more the left-eye video signal shifts to right and the right-eye video signal shifts to left. This enables to generate stereoscopic video signal easily.

(3) The Second Embodiment of the Stereoscopic Image Generation Apparatus

Figure 7:
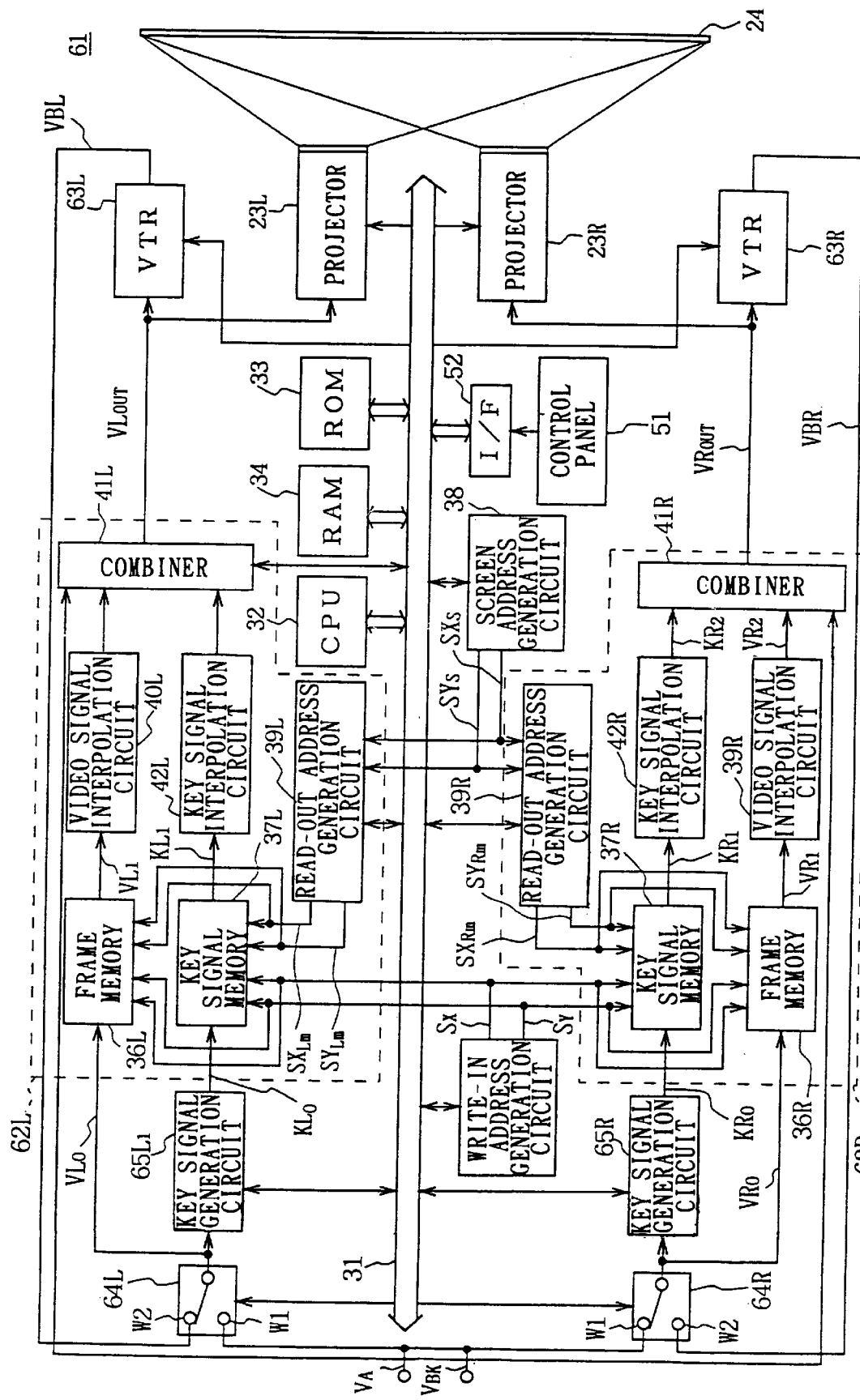
FIG. 7 is a block diagram showing the second embodiment of the stereoscopic image generation apparatus according to the present invention.

FIG. 7 shows the second embodiment of the present invention in which the same number is applied to the corresponding part of the stereoscopic image generation apparatus 61 in FIG. 6. The left-eye and right-eye stereoscopic image output signals $VL_{OUT}$ and $VR_{OUR}$ obtained from left-eye and right-eye projectors 62L and 62R are output to the left-eye and right-eye projectors 23L and 23R respectively and recorded in left-eye and right-eye video signal recording devices 63L and 63R consisting of, for example, video tape recorders.

The left-eye and right-eye video signal recording devices 63L and 63R are controlled by the CPU 32 so as to reproduce the recorded video signal as left-eye and right-eye feedback video signals VBL and VBR and feedback them to the frame memories 36L and 36R of the left-eye and right-eye processors 62L and 62R as image input signals $VL_0$ and $VR_0$ through switching input terminal W2 of switches 64L and 64R.

In this embodiment, the input video signal $V_A$ is input to the frame memories 36L and 36R as input video signals $WL_0$ and $WR_0$ through two first switch terminals W1 of the left-eye and right-eye switches 64L and 64R both of which execute switching operations controlled by the CPU 32.

The input video signals $VL_0$ and $VR_0$ input through the left-eye and right-eye switches 64L and 64R are also input to key signal generation circuits 65L and 65R of the left-eye and right-eye processors 62L and 62R. Thus the CPU 32 controls to input key signals $KL_0$ and $KR_0$ capable of keying process synchronized with the input video signals $VL_0$ and $VR_0$ from the key signal generation circuits 65L and 65R both of which execute the key signal generation operations to the key signal memories 37L and 37R.

Figure 8:
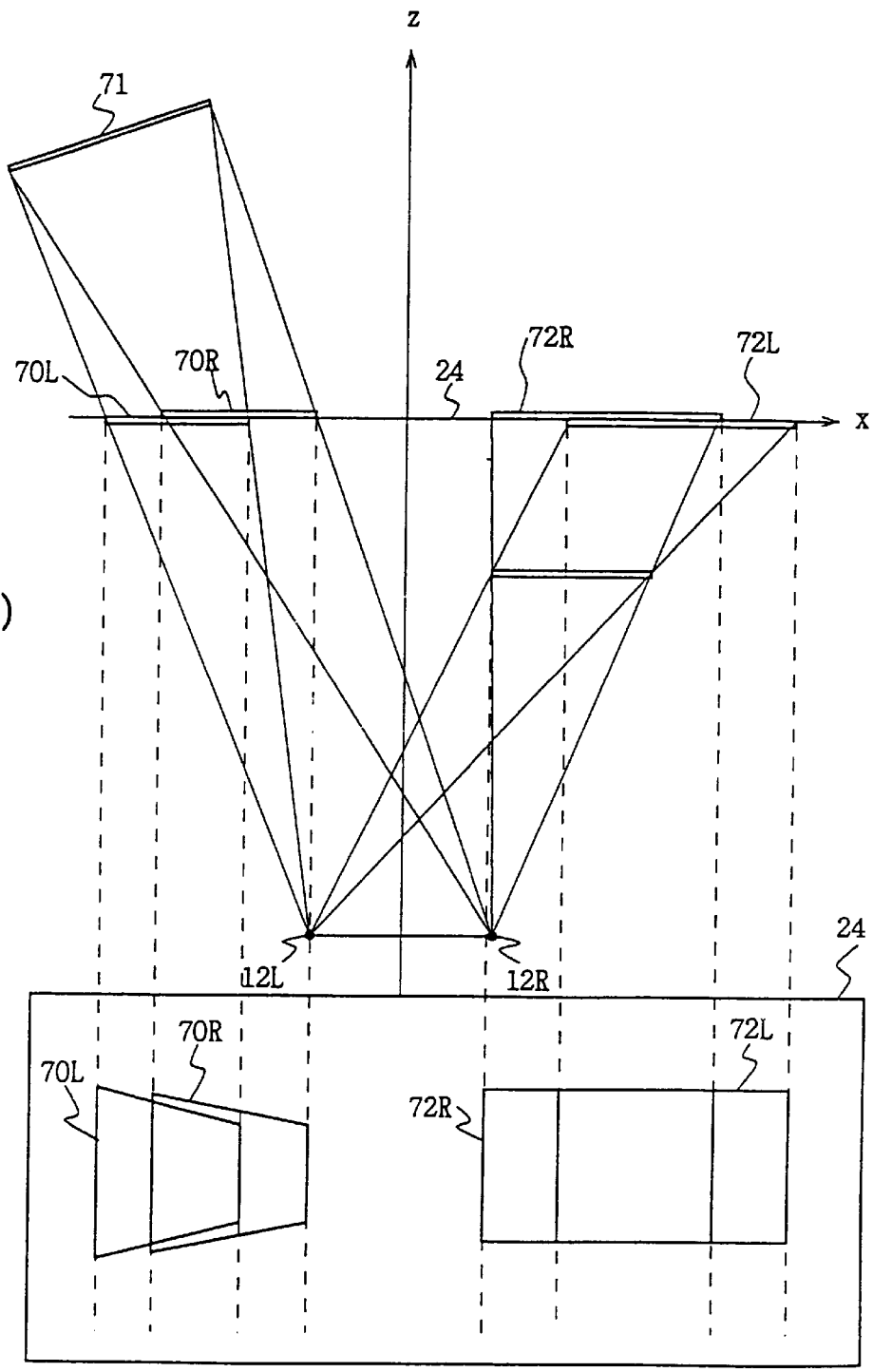
FIGS. 8(A) and 8(B) are schematic diagrams explaining the operation of FIG. 7.

With the structure of FIG. 7, as shown in FIGS. 8(A) and 8(B), the first left-eye and right-eye images 70L and 70R out of images projected on the screen 24 from the left-eye and right-eye projectors 23L and 23R are projected on part of the screen 24, for instance the left part, and the second left-eye and right-eye images 72L and 72R are projected on the other part of the screen 24, for instance the right part.

The first left-eye and right-eye images 70L and 70R convert the image represented by the input video signal $V_A$ with the image transform method described above referring to FIGS. 4(A1) to (B2).

In this embodiment, the operator recognizes the first left-eye and right-eye images 70L and 70R as a stereoscopic image 71 formed based on the input video signal $V_A$ by seeing virtual image with the operator's left and right eyes 12L and 12R.

On the other hand, the second left-eye and right-eye images 72L and 72R projected on the right part of the screen 24 are such images as the images represented by the left-eye and right-eye feedback video signals VBL and VBR reproduced from the left-eye and right-eye video signal recording devices 63L and 63R are read out from the frame memories 36L and 36R with the read-out address signals $SX_{Lm}$, $SY_{Lm}$ and $SX_{Rm}$, $SY_{Rm}$, which are executed the image transform process with the image transform method described above according to FIGS. 4(A1) to 4(B2), and then projected on the screen 24.

In the case of FIG. 8(A), the operator's left eye 12L and right eye 12R toward the second left-eye and right-eye images 72L and 72R intersects with each other in front of the screen 24. This enables the operator to recognize a stereoscopic image 73 formed by the left-eye and right-eye feedback video signals VBL and VBR in the virtual space in front of the screen 24.

With the structure shown in FIG. 7, the left-eye and right-eye switches 64L and 64R are controlled by the CPU 32 so as to let the video signal $V_A$ through the first switch input terminals W1 at the timing of left portion out of the image section for one frame. The video signal $V_A$ is then stored in the left memory area of the left-eye and right-eye frame memories 36L and 36R.

On the other hand, the left-eye and right-eye switches 64L and 64R switch to the second switch input terminals W2 in the term of left portion out of the term for one frame, so that the left-eye and right-eye feedback video signals VBL and VBR are stored in the frame memories 36L and 36R.

As a result, the image data for one frame including two video data is stored in the frame memories 36L and 36R, and the read-out address signal is generated by being executed the image transform process at the read-out address generation circuits 39L and 39R under the control of the CPU 32. Thus the left-eye and right-eye stereoscopic image output signals $VL_{out}$ and $VR_{out}$ consisting of the image for one frame representing the first left-eye and right-eye video signals 70L and 70R and the second left-eye and right-eye images 72L and 72R are output to the projectors 23L and 23R.

The left-eye and right-eye stereoscopic image output signals $VL_{out}$ and $VR_{out}$ representing the image for one frame to which the image transform process is executed are stored in the left-eye and right-eye video signal recording devices 63L and 63R, and then only the video signals of the second left-eye and right-eye images 72L and 72R are stored as the left-eye and right-eye switches 64L and 64R in the frame memories 36L and 36R through the left-eye and right-eye switches 24L and 24R.

Here, if the input video signal $V_A$ is exactly the same as it has been, only the second left-eye and right-eye images 72L and 72R out of the image data for one frame stored in the frame memories 36L and 36R are changed with the image transform process at the read-out address generation circuits 39L and 39R.

In this state, if the read-out address generation circuits 39L and 39R are controlled by the CPU 32 s0 as to execute again the image transform process, only the second left-eye and right-eye images 72L and 72R are executed the image transform process shown in FIGS. 4(A1) to 4(B2), and then output to the projectors 23L and 23R as the left-eye and right-eye stereoscopic image output signals $VL_{out}$ and $VR_{out}$.

The image transform process is executed time and again on the second left-eye and right-eye images 72L and 72R projected on the right part of the screen 24 by the projectors 23L and 23R, so that the stereoscopic image 73 formed by the feedback video signals VBL and VBR is changing sequentially in every frame. On the contrary, the stereoscopic image 71 formed by the first left-eye and right-eye images 70L and 70R which are based on the input video signal $V_A$ with no change in its contents does not change. Therefore the operator recognizes it as the fixed image.

As described above, according to the structure shown in FIG. 7, only the desired part of the stereoscopic image generated on the screen 24 can be fed back as the left-eye and right-eye feedback video signals VBL and VBR to the frame memories 36L and 36R. It is thus possible to easily generate the stereoscopic image as if a part of the stereoscopic image is changing by the image transform process repeatedly executed.

(4) The Other Embodiments

In the embodiments described above, previous fixation of the parameter $P_z$ in the equation (3) for the see-through matrix $P_0$ to 1/16 keeps the perspective value based on the perspective. However, the present invention is not only limited to this, but if the parameter $P_z$ is changeable according to the operation with the control panel 51 by the operator, the same effect as the above-mentioned embodiment can be obtained.

Further, in the above-mentioned embodiment of FIG. 7, feedback of a part of image projected on the screen 24 to the frame memories 36L and 36R enables to repeatedly execute the image transform process on the part of image. However, the present invention is not only limited to this, but the image transform process can be repeatedly executed on entire image generated on the screen 24.

Further, in the embodiment described above, projection of the left-eye and right-eye stereoscopic image output signals $VL_{out}$ and $VR_{out}$ on the screen 24 by the left-eye and right-eye projectors 23L and 23R generates the stereoscopic image. However, display means of stereoscopic image is not only limited to this, but the other type of image displaying apparatus, for example a head-mounted type image apparatus, can be utilized.

Further, in the above-mentioned embodiment of FIG. 7, video tape recorders are utilized in the left-eye and right-eye video signal recording devices. However, the video signal recording apparatus is not only limited to this, but the other image recording devices can be utilized such as a video disc device or a semiconductor memory devices.

Industrial Applicability

The present invention can be applied to a stereoscopic image generation apparatus which generates stereoscopic image by using video signal representing two-dimensional image.

We claim:

1. A stereoscopic image generation apparatus for generating video signal in order to obtain stereoscopic effects visually, comprising:

a left-eye processor for generating left-eye stereoscopic video signal from source video signal based on a spatial image transform matrix for image transform which converts an image represented by said source video signal to virtual spatial position, and a left-eye perspective transform matrix for having a converted image represented by the converted transform video signal seen through on a screen; and a right-eye processor for generating right-eye stereoscopic video signal from said source video signal based on said spatial image transform matrix and a right-eye perspective transform matrix for having a converted image represented by said transform video signal seen through on the screen, wherein:

said spatial image transform matrix $T_0$ is defined as follows:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_O \end{bmatrix}$$

said left-eye perspective transform matrix $P_L$ is defined as follows:

$$P_L = \begin{bmatrix} 1 & 0 & 0 & 0 \\ 0 & 1 & 0 & 0 \\ -P_z \Delta x & 0 & 0 & P_z \\ 0 & 0 & 0 & 1 \end{bmatrix}$$

said right-eye perspective transform matrix $P_R$ is defined as follows:

$$P_R = \begin{bmatrix} 1 & 0 & 0 & 0 \\ 0 & 1 & 0 & 0 \\ P_z \Delta x & 0 & 0 & P_z \\ 0 & 0 & 0 & 1 \end{bmatrix}$$

provided that, $r_{11}$ to $r_{33}$ are the parameters representing spatial rotary transform;

$l_x$ is the parameter representing parallel movement in the direction of x-axis;

$l_y$ is the parameter representing parallel movement in the direction of y-axis;

$l_z$ is the parameter representing parallel movement in the direction of z-axis;

$S_o$ is the parameter representing two-dimensional extension and reduction;

$P_z$ is the perspective value previously set; and $\Delta x$ is the value representing a half of distance between the right-eye and left-eye.

2. The stereoscopic image generation apparatus according to claim 1, wherein:

said left-eye perspective conversion matrix $P_L$ is obtained as follows;

$$P_L = L P_0 L^{-1}$$

said right-eye perspective conversion matrix $P_R$ is obtained as follows;

$$P_R = L^{-1} L P_0$$

provided that, the matrix L is defined as follows;

$$L = \begin{bmatrix} 1 & 0 & 0 & 0 \\ 0 & 1 & 0 & 0 \\ 0 & 0 & 1 & 0 \\ \Delta x & 0 & 0 & 1 \end{bmatrix}$$

the matrix $L^{-1}$ is defined as follows;

$$L^{-1} = \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix}$$

and the matrix $P_0$ is defined as follows;

$$P_0 = \begin{bmatrix} 1 & 0 & 0 & 0 \\ 0 & 1 & 0 & 0 \\ 0 & 0 & 1 & P_z \\ 0 & 0 & 0 & 1 \end{bmatrix}$$

3. The stereoscopic image generation apparatus according to claim 2, wherein:

said left-eye processor comprises first storing means for storing said source video signal temporarily; and first read-out address generation means for generating read-out address, which is calculated based on said spatial image transform matrix and said left-eye perspective transform matrix, for reading out the video signal stored in said first storing means;

said right-eye processor comprises second storing means for storing said source video signal temporarily; and second read-out address generation means for generating read-out address, which is calculated based on said spatial transform matrix and said right-eye perspective transform matrix, for reading out the video signal stored in said second storing means.

4. The stereoscopic image generation apparatus according to claim 3, wherein:

read-out address $(X_{Lm}, Y_{Lm})$ supplied to said first storing means are as follows;

$$X_{Lm} = \frac{1}{H_L}[\{-l_x \cdot r_{23} \cdot P_z + r_{22}(l_z P_z + S_0)\} \cdot X_S + \{l_y \cdot r_{13} \cdot P_z + r_{12}(l_z P_z + S_0)\} Y_S + (-r_{22} \cdot r_{13} \cdot P_z + r_{12} \cdot r_{23} \cdot P_z)]$$

$$Y_{Lm} = \frac{1}{H_L}[\{(l_x - l_z P_z \Delta x) r_{23} P_z - (r_{21} - r_{23} P_z \Delta x) \cdot (l_z P_z + S_0)\} X_S + \{-(l_x - l_z P_z \Delta x \cdot r_{13} \cdot P_z) + (r_{11} - r_{13} P_z \Delta x) \cdot (l_z P_z + S_0)\} Y_S + (r_{21} - r_{23} P_z \Delta x) \cdot r_{13} \cdot P_z - (r_{11} - r_{13} P_z \Delta x) \cdot r_{23} \cdot P_z\}]$$

provided that, the definition will be made by the following equation;

$$H_L = \{-r_{22}(l_x - l_z P_z \Delta x) + (r_{21} - r_{23} P_z \Delta x) \cdot l_y\} X_S + \{r_{12}(l_x - l_z P_z \Delta x) - (r_{11} - r_{13} P_z \Delta x) \cdot l_y\} Y_S + \{-r_{12} \cdot (r_{21} - r_{23} P_z \Delta x) + (r_{11} - r_{13} P_z \Delta x) r_{22}\}$$

read-out address $(X_{Rm}, Y_{Rm})$ supplied to said second storing means are;

$$X_{Rm} = \frac{1}{H_R}[\{-l_x \cdot r_{23} \cdot P_z + r_{22}(l_z P_z + S_0)\} \cdot X_S + \{l_y \cdot r_{13} \cdot P_z + r_{12}(l_z P_z + S_0)\} Y_S + (-r_{22} \cdot r_{13} \cdot P_z + r_{12} \cdot r_{23} \cdot P_z)]$$

$$Y_{Rm} = \frac{1}{H_R}[\{(l_x + l_z P_z \Delta x) r_{23} P_z - (r_{21} + r_{23} P_z \Delta x) \cdot (l_z P_z + S_0)\} X_S + \{-(l_x + l_z P_z \Delta x \cdot r_{13} \cdot P_z + (r_{11} + r_{13} P_z) \Delta x) \cdot (l_z P_z + S_0)\} Y_S + (r_{21} + r_{23} P_z \Delta x) \cdot r_{13} P_z - (r_{11} + r_{13} P_z \Delta x) \cdot r_{23} \cdot P_z\}]$$

provided that, the definition will be made as follows;

$$H_R = \{-r_{22}(l_x + l_z P_z \Delta x) + (r_{21} + r_{23} P_z \Delta x) \cdot l_y\} X_S + \{r_{12}(l_x + l_z P_z \Delta x) - (r_{11} + r_{13} P_z \Delta x) \cdot l_y\} Y_S + \{-r_{12} \cdot (r_{21} + r_{23} P_z \Delta x) + (r_{11} + r_{13} P_z \Delta x) r_{22}\}$$

and, $X_s$ and $Y_s$ are screen addresses corresponding to the raster scanning.

5. The stereoscopic image generation apparatus according to claim 4, wherein said same screen addresses are sequentially supplied to both of said first read-out address generation means and said second read-out address generation means.

6. The stereoscopic image generation apparatus according to claim 3, comprising:
   write-in address generation means for generating write-in address for writing said source video signal in said first storing means and said second storing means, and wherein:
   the same write-in addresses are supplied from said write-in address generation means to said first storing means and said second storing means, respectively.

7. A stereoscopic image generation apparatus for generating video signal in order to obtain stereoscopic effects visually, comprising:
   a left-eye processor for generating left-eye stereoscopic video signal from source video signal based on a spatial image transform matrix for image transform which converts an image represented by said source video signal to virtual spatial position, and a left-eye perspective transform matrix for having a converted image represented by the converted transform video signal seen through on a screen; and
   a right-eye processor for generating right-eye stereoscopic video signal from said source video signal based on said spatial image transform matrix and a right-eye perspective transform matrix for having a converted image represented by said transform video signal seen through on the screen, further comprising:
   a first recording/reproducing device for recording the output video signal output from said left-eye processor to a recording medium and for reproducing the recorded video signal from the recording medium;
   a second recording/reproducing device for recording the output video signal output from said right-eye processor to a recording medium and for reproducing the recorded video signal from the recording medium;
   first key signal generation means for generating key signal from the first reproduced video signal reproduced from said first recording/reproducing device;
   second key signal generation means for generating key signal from the second reproduced video signal reproduced from said second recording/reproducing device, and wherein:
   said left-eye processor
   receives the first reproduced video signal reproduced from said first recording/reproducing device, the key signal generated by said first key signal generation means, and background video signal used for the background of said source video signal;
   executes first spatial image conversion to said first reproduced video signal and the same spatial image transform as said first spatial image transform to said key signal based on said spatial image transform matrix and said left-eye perspective transform matrix; and
   composites the video signal converted by said first image transform means with said background video signal based on the key signal converted by said first image transform means; and
   said right-eye processor
   receives the second reproduced video signal reproduced from said second recording/reproducing device, the key signal generated by said second key signal generation means, and said background video signal;
   executes the second spatial image transform to said second reproduced video signal and the same spatial image transform as said second spatial image transform to said key signal based on said spatial image transform matrix and said right-eye perspective transform matrix; and
   composites the video signal converted by said second image transform means with said background video signal based on the key signal converted by said second image transform means.

8. The stereoscopic image generation apparatus according to claim 7, wherein
   the key signal generated by said first key signal generation means is the same signal as the key signal generated by said second key signal generation means.

9. A video signal generation apparatus for generating video signal for visual stereoscopic effects, comprising:
   image transform means for converting an image represented by source video signal to a virtual spatial position;
   left-eye video signal generation means for generating left-eye video signal representing an image seen trough on a screen surface based on the virtual spatial position where there is the image of the converted video signal converted by said image transform means and left-eye spatial position; and
   right-eye video signal generation means for generating right-eye video signal representing an image seen through on a screen surface based on the virtual spatial position where there is the image of said converted video signal and right-eye spatial position, wherein:
   said image transform means converts said source video signal based on spatial image transform matrix;
   said left-eye video signal generation means generates said left-eye video signal based on left-eye perspective transform matrix; and
   said right-eye video signal generation means generates said right-eye video signal based on right-eye perspective transform matrix, wherein:
   said spatial image transform matrix $T_0$ is defined as follows:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_O \end{bmatrix}$$

said left-eye perspective transform matrix $P_L$ is defined as follows:

$$P_L = \begin{bmatrix} 1 & 0 & 0 & 0 \\ 0 & 1 & 0 & 0 \\ -P_z \Delta x & 0 & 0 & P_z \\ 0 & 0 & 0 & 1 \end{bmatrix}$$

said right-eye perspective transform matrix $P_R$ is defined as follows:

$$P_R = \begin{bmatrix} 1 & 0 & 0 & 0 \\ 0 & 1 & 0 & 0 \\ P_z \Delta x & 0 & 0 & P_z \\ 0 & 0 & 0 & 1 \end{bmatrix}$$

provided that, $r_{11}$ to $r_{33}$ are parameters representing spatial rotary transform;
   $l_x$ is the parameter representing parallel movement in the direction of x-axis;

$l_y$ is the parameter representing parallel movement in the direction of y-axis;

$l_z$ is the parameter representing parallel movement in the direction of z-axis;

$S_o$ is the parameter representing two-dimensional extension and reduction; and $\Delta x$ is a value showing a half of distance of a right eye and a left-eye.

10. The video signal generation apparatus according to claim 9, wherein:

said left-eye perspective transform matrix $P_L$ is obtained as follows;

$$P_L = L P_0 L^{-1}$$

said right-eye perspective transform matrix $P_R$ is obtained as follows;

$$P_R = L^{-1} L P_0$$

proveded that, the matrix L is defined as follows;

$$L = \begin{bmatrix} 1 & 0 & 0 & 0 \\ 0 & 1 & 0 & 0 \\ 0 & 0 & 1 & 0 \\ \Delta x & 0 & 0 & 1 \end{bmatrix}$$

the matrix $L^{-1}$ is defined as follows;

$$L^{-1} = \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix}$$

and the matrix $P_0$ is defined as follows:

$$P_0 = \begin{bmatrix} 1 & 0 & 0 & 0 \\ 0 & 1 & 0 & 0 \\ 0 & 0 & 1 & P_z \\ 0 & 0 & 0 & 1 \end{bmatrix}$$

11. The video signal generation apparatus according to claim 10, wherein:

said left-eye video signal generation means comprises first storing means for storing said source video signal temporarily; and first read-out address generation means for generating read-out address for reading out the video signal which is calculated based on said spatial image transform matrix and said left-eye perspective transform matrix and is stored in said first storing means;

said right-eye video signal generation means comprises second storing means for storing said source video signal temporarily; and second read-out address generation means for generating read-out address for reading out the video signal which is calculated based on said spatial image transform matrix and said right-eye perspective transform matrix and is stored in said second storing means.

12. The video signal generation apparatus according to claim 11, wherein:

the read-out address $(X_{Lm}, Y_{Lm})$ supplied to said first storing means is as follows;

$$X_{Lm} = \frac{1}{H_L}[\{-l_x \cdot r_{23} \cdot P_z + r_{22}(l_z P_z + S_0)\} \cdot X_S +$$
$$\{l_y \cdot r_{13} \cdot P_z + r_{12}(l_z P_z + S_0)\} Y_S +$$
$$(-r_{22} \cdot r_{13} \cdot P_z + r_{12} \cdot r_{23} \cdot P_z)]$$

$$Y_{Lm} = \frac{1}{H_L}[\{l_x - l_z P_z \Delta x) r_{23} P_z -$$
$$(r_{21} - r_{23} P_z \Delta x) \cdot (l_z P_z + S_0)\} X_S +$$
$$\{-(l_x - l_z P_z \Delta x \cdot r_{13} \cdot P_z) +$$
$$(r_{11} - r_{13} P_z \Delta x) \cdot (l_z P_z + S_0)\} Y_S +$$
$$(r_{21} - r_{23} P_z \Delta x) \cdot r_{13} \cdot P_z -$$
$$(r_{11} - r_{13} P_z \Delta x) \cdot r_{23} \cdot P_z\}]$$

provided that, definition is done as follows;

$$H_L = \{-r_{22}(l_x - l_z P_z \Delta x) + (r_{21} - r_{23} P_z \Delta x) \cdot l_y\} X_S +$$
$$\{r_{12}(l_x - l_z P_z \Delta x) - (r_{11} - r_{13} P_z \Delta x) \cdot l_y\} Y_S +$$
$$\{-r_{12} \cdot (r_{21} - r_{23} P_z \Delta x) + (r_{11} - r_{13} P_z \Delta x) r_{22}\}$$

the read-out address $(X_{Rm}, Y_{Rm})$ supplied to said second storing means is as follows;

$$X_{Rm} = \frac{1}{H_R}[\{-l_x \cdot r_{23} \cdot P_z + r_{22}(l_z P_z + S_0)\} \cdot X_S +$$
$$\{l_y \cdot r_{13} \cdot P_z + r_{12}(l_z P_z + S_0)\} Y_S +$$
$$(-r_{22} \cdot r_{13} \cdot P_z + r_{12} \cdot r_{23} \cdot P_z)]$$

$$Y_{Rm} = \frac{1}{H_R}[\{l_x + l_z P_z \Delta x) r_{23} P_z -$$
$$(r_{21} + r_{23} P_z \Delta x) \cdot (l_z P_z + S_0)\} X_S +$$
$$(-(l_x + l_z P_z \Delta x \cdot r_{13} \cdot P_z) +$$
$$(r_{11} + r_{13} P_z \Delta x) \cdot (l_z P_z + S_0)\} Y_S +$$
$$\{r_{21} + r_{23} P_z \Delta x) \cdot r_{13} P_z) -$$
$$(r_{11} + r_{13} P_z \Delta x) \cdot r_{23} \cdot P_z\}]$$

provided that, definition is done as follows:

$$H_R = \{-r_{22}(l_x + l_z P_z \Delta x) + (r_{21} + r_{23} P_z \Delta x) \cdot l_y\} X_S +$$
$$\{r_{12}(l_x + l_z P_z \Delta x) - (r_{11} + r_{13} P_z \Delta x) \cdot l_y\} Y_S +$$
$$\{-r_{12} \cdot (r_{21} + r_{23} P_z \Delta x) + (r_{11} + r_{13} P_z \Delta x) r_{22}\}$$

and provided that, $X_s$ and $Y_s$ are screen addresses.

13. The video signal generation apparatus according to claim 12, wherein the same screen addresses are sequentially supplied to both said first read-out address generation means and said second read-out address generation means corresponding to raster scanning.

14. The video signal generation apparatus according to claim 11, comprising:

write-in address generation means for generating write-in address for writing said source video signal in said first storing means and said second storing means, and wherein:

same write-in address is supplied from said write-in address generation means to the write-in address supplied to said first storing means and said second storing means.

15. A video signal generation apparatus for generating video signal for visual stereoscopic effects, comprising:

- image transform means for converting an image represented by source video signal to a virtual spatial position;
- left-eye video signal generation means for generating left-eye video signal representing an image seen trough on a screen surface based on the virtual spatial position where there is the image of the converted video signal converted by said image transform means and left-eye spatial position; and
- right-eye video signal generation means for generating right-eye video signal representing an image seen through on a screen surface based on the virtual spatial position where there is the image of said converted video signal and right-eye spatial position, wherein:
  - said image transform means converts said source video signal based on spatial image transform matrix;
  - said left-eye video signal generation means generates said left-eye video signal based on left-eye perspective transform matrix; and
  - said right-eye video signal generation means generates said right-eye video signal based on right-eye perspective transform matrix, comprising:
    - first recording/reproducing device for recording output video signal output from said left-eye video signal generation means to a recording medium and for reproducing the recorded video signal from the recording medium;
    - second recording/reproducing device for recording output video signal output from said right-eye video signal generation means to a recording medium and for reproducing the recorded video signal from the recording medium;
    - first key signal generation means for generating key signal from the first reproduced video signal reproduced from said first recording/reproducing device; and
    - second key signal generation means for generating key signal from the second reproduced video signal reproduced from said second recording/reproducing device, wherein:
      - said left-eye video signal generation means
      - receives the first reproduced video signal reproduced from said first recording/reproducing device, the key signal generated by said first key signal generation means, and background video signal used for the background of said source video signal;
      - executes first spatial image transform to said first reproduced video signal and the same spatial image transform as said first spatial image transform to said key signal based on said spatial image transform matrix and said left-eye perspective transition matrix; and
      - composites the video signal converted by said first image transform means with said background video signal based on the key signal converted by said first image transform means; wherein
        - said right-eye processor
      - receives the second reproduced video signal reproduced from said second recording/reproducing device, the key signal generated by said second key signal generation means and said background video signal;
      - executes second spatial image transform to said second reproduced video signal and the same spatial image transform as said second spatial image transform to said key signal based on said spatial image transform matrix and said right-eye perspective transform matrix; and
      - composites the video signal converted by said second image transform means with said background video signal based on the key signal converted by said second image transform means.

16. The video signal generation apparatus according to claim 15, wherein the key signal generated by said first key signal generation means is the same key signal as the key signal generated by said second key signal generation means.

17. A video signal generation method for generating video signal for obtaining the virtual stereoscopic effects, comprising:

(a) first step of converting source video signal to virtual spatial position;

(b) second step of generating left-eye video signal seen through on a screen surface based on the virtual spatial position of the converted video signal converted at said first step and spatial position of the left eye; and (c) third step of generating right-eye video signal seen through on a screen surface based on the virtual spatial position of the converted video signal converted at said first step and spatial position of the right eye, wherein:

said source video signal is converted at said first step based on spatial image transform matrix having parameters corresponding to spatial transform operation which the operator desires;

said left-eye video signal is generated at said second step based on left-eye perspective transform matrix having parameters previously set by the operator; and said right-eye video signal is generated at said third step based on right-eye perspective transform matrix having parameters previously set by the operator, wherein said spatial image transform matrix $T_0$ is defined as follows:

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S_O \end{bmatrix}$$

said left-eye perspective transform matrix $P_L$ is defined as follows:

$$P_L = \begin{bmatrix} 1 & 0 & 0 & 0 \\ 0 & 1 & 0 & 0 \\ -P_z \Delta x & 0 & 0 & P_z \\ 0 & 0 & 0 & 1 \end{bmatrix}$$

said right-eye perspective transform matrix $P_R$ is defined as follows:

$$P_R = \begin{bmatrix} 1 & 0 & 0 & 0 \\ 0 & 1 & 0 & 0 \\ P_z \Delta x & 0 & 0 & P_z \\ 0 & 0 & 0 & 1 \end{bmatrix}$$

provided that, $r_{11}$ to $r_{33}$ are the parameters representing spatial rotary transform;

$l_x$ is the parameter representing parallel movement in the direction of x-axis;

$l_y$ is the parameter representing parallel movement in the direction of y-axis;

$l_z$ is the parameter representing parallel movement in the direction of z-axis;

$S_o$ is the parameter representing two-dimensional extension and reduction;

$P_z$ is the perspective value previously set; and $\Delta x$ is the value representing a half of distance between the right-eye and left-eye.

18. The video signal generation apparatus according to claim 17, wherein:

said left-eye perspective transform matrix $P_L$ is obtained as follows:

$$P_L = L P_0 L^{-1}$$

said right-eye perspective transform matrix $P_R$ is obtained as follows:

$$P_R = L^{-1} L P_0$$

provided that, the matrix L is defined as follows;

$$L = \begin{bmatrix} 1 & 0 & 0 & 0 \\ 0 & 1 & 0 & 0 \\ 0 & 0 & 1 & 0 \\ \Delta x & 0 & 0 & 1 \end{bmatrix}$$

the matrix $L^{-1}$ is defined as follows;

$$L^{-1} = \begin{bmatrix} 1 & 0 & 0 & 0 \\ 0 & 1 & 0 & 0 \\ 0 & 0 & 1 & 0 \\ -\Delta x & 0 & 0 & 1 \end{bmatrix}$$

and the matrix $P_0$ is defined as follows;

$$P_0 = \begin{bmatrix} 1 & 0 & 0 & 0 \\ 0 & 1 & 0 & 0 \\ 0 & 0 & 1 & P_z \\ 0 & 0 & 0 & 1 \end{bmatrix}.$$

19. The video signal generation method according to claim 18, further comprising the steps of:

temporarily storing said source video signal to first storing means and second storing means;

generating left-eye read-out address for reading out the video signal stored in said first storing means based on said spatial image transform matrix and said left-eye perspective transform matrix; and generating right-eye read-out address for reading out the video signal stored in said second storing means based on said spatial image transform matrix and said right-eye perspective transform matrix.

20. The video signal generation method according to claim 19, wherein:

said left-eye read-out address $(X_{Lm}, Y_{Lm})$ are;

$$X_{Lm} = \frac{1}{H_L}[\{-l_x \cdot r_{23} \cdot P_z + r_{22}(l_z P_z + S_0)\} \cdot X_S +$$
$$\{l_y \cdot r_{13} \cdot P_z + r_{12}(l_z P_z + S_0)\} Y_S +$$
$$(-r_{22} \cdot r_{13} \cdot P_z + r_{12} \cdot r_{23} \cdot P_z)]$$

$$Y_{Lm} = \frac{1}{H_L}[\{(l_x - l_z P_z \Delta x) r_{23} P_z -$$
$$(r_{21} - r_{23} P_z \Delta x) \cdot (l_z P_z + S_0)\} X_S +$$
$$\{-(l_x - l_z P_z \Delta x \cdot r_{13} \cdot P_z) +$$
$$(r_{11} - r_{13} P_z \Delta x) \cdot (l_z P_z + S_0)\} Y_S +$$
$$(r_{21} - r_{23} P_z \Delta x) \cdot r_{13} \cdot P_z -$$
$$(r_{11} - r_{13} P_z \Delta x) \cdot r_{23} \cdot P_z\}]$$

provided that;

$$H_L = \{-r_{22}(l_x - l_z P_z \Delta x) + (r_{12} - r_{23} P_z \Delta x) \cdot l_y\} X_S +$$
$$\{r_{12}(l_x - l_z P_z \Delta x) - (r_{11} - r_{13} P_z \Delta x) \cdot l_y\} Y_S +$$
$$\{-r_{12} \cdot (r_{21} - r_{23} P_z \Delta x) + (r_{11} - r_{13} P_z \Delta x) r_{22}\}$$

said right-eye read-out address $(X_{Rm}, Y_{Rm})$ are as follows;

$$X_{Rm} = \frac{1}{H_R}[\{-l_x \cdot r_{23} \cdot P_z + r_{22}(l_z P_z + S_0)\} \cdot X_S +$$
$$\{l_y \cdot r_{13} \cdot P_z + r_{12}(l_z P_z + S_0)\} Y_S +$$
$$(-r_{22} \cdot r_{13} \cdot P_z + r_{12} \cdot r_{23} \cdot P_z)]$$

$$Y_{Rm} = \frac{1}{H_R}[\{(l_x + l_z P_z \Delta x) r_{23} P_z -$$
$$(r_{21} + r_{23} P_z \Delta x) \cdot (l_z P_z + S_0)\} X_S +$$
$$\{-(l_x + l_z P_z \Delta x \cdot r_{13} \cdot P_z) +$$
$$(r_{11} + r_{13} P_z \Delta x) \cdot (l_z P_z + S_0)\} Y_S +$$
$$(r_{21} + r_{23} P_z \Delta x) \cdot r_{13} P_z -$$
$$(r_{11} + r_{13} P_z \Delta x) \cdot r_{23} \cdot P_z\}]$$

provided that, it is defined as follows;

$$H_R = \{-r_{22}(l_x + l_z P_z \Delta x) + (r_{21} + r_{23} P_z \Delta x) \cdot l_y\} X_S +$$
$$\{r_{12}(l_x + l_z P_z \Delta x) - (r_{11} + r_{13} P_z \Delta x) \cdot l_y\} Y_S +$$
$$\{-r_{12} \cdot (r_{21} + r_{23} P_z \Delta x) + (r_{11} + r_{13} P_z \Delta x) r_{22}\}$$

and, $X_s$ and $Y_s$ are screen addresses corresponding to the raster scanning.

* * * * *